United States Patent
Carlson et al.

(10) Patent No.: US 10,660,735 B2
(45) Date of Patent: May 26, 2020

(54) SYSTEMS AND METHODS FOR RECORDING MANDIBULAR MOVEMENT

(71) Applicant: DentiGrafix LLC, Eden Prairie, MN (US)

(72) Inventors: Gary L. Carlson, Eden Prairie, MN (US); James Patrick Moorman, Bloomington, MN (US)

(73) Assignee: DentiGrafix LLC, Eden Prairie, MN (US)

( * ) Notice: Subject to any disclaimer, the term of this patent is extended or adjusted under 35 U.S.C. 154(b) by 26 days.

(21) Appl. No.: 15/944,256

(22) Filed: Apr. 3, 2018

(65) Prior Publication Data

US 2019/0117360 A1    Apr. 25, 2019

Related U.S. Application Data

(60) Provisional application No. 62/574,536, filed on Oct. 19, 2017.

(51) Int. Cl.
```
A61C 19/05       (2006.01)
G01B 11/00       (2006.01)
```
(Continued)

(52) U.S. Cl.
CPC ............ *A61C 19/052* (2013.01); *A61C 11/02* (2013.01); *A61C 19/045* (2013.01); *G01B 11/002* (2013.01)

(58) Field of Classification Search
CPC .......... A61C 19/045–055; A61C 11/02; G01B 11/002

(Continued)

(56) References Cited

U.S. PATENT DOCUMENTS 2,814,876 A * 12/1957 Stuart .................. A61C 19/045
                                                        433/69
3,724,099 A    4/1973 Stuart
(Continued)

FOREIGN PATENT DOCUMENTS

JP       02001241 A    1/1990
JP       07007935 Y2   3/1995
(Continued)

OTHER PUBLICATIONS

"CONDYLOCOMP(r) LR3 Brochure", DENTRON GmbH, (Prior to Feb. 26, 2009), 4 pgs.
(Continued)

*Primary Examiner* — Matthew M Nelson
(74) *Attorney, Agent, or Firm* — Schwegman Lundberg & Woessner, P.A.

(57) ABSTRACT

A clutch apparatus includes a mandibular clutch device and a maxillary clutch device. The mandibular clutch device includes a mandibular clutch configured to be affixed to mandibular teeth, a mandibular face bow connected to the mandibular clutch, and first and second collimated light sources connected to the mandibular face bow. The maxillary clutch device includes a maxillary clutch configured to be affixed to maxillary teeth, a maxillary face bow connected to the maxillary clutch, and first and second position-sensitive diodes (PSDs) connected to the maxillary face bow. Each of the mandibular and maxillary face bow is selectively adjustable to position the first and second light sources and the first and second PSDs in a plurality of positions. In an example, the mandibular and maxillary face bow are selectively adjustable to position the first and second light sources and the first and second PSDs proximate right and left bicuspid regions or proximate the actual physiologic axis of rotation of the mandible.

24 Claims, 13 Drawing Sheets

(51) Int. Cl.
*A61C 11/02* (2006.01)
*A61C 19/045* (2006.01)

(58) Field of Classification Search
USPC .......................................................... 433/69
See application file for complete search history.

(56) References Cited

U.S. PATENT DOCUMENTS

| | | | |
|---|---|---|---|
| 3,818,595 A | 6/1974 | Stuart | |
| 3,896,551 A | 7/1975 | Stuart | |
| 4,014,097 A * | 3/1977 | Pameijer | A61C 19/045 |
| | | | 433/27 |
| 4,204,326 A | 5/1980 | Dimeff | |
| 4,354,836 A | 10/1982 | Santoni | |
| 4,468,198 A | 8/1984 | Kataoka et al. | |
| 4,482,320 A | 11/1984 | Kataoka et al. | |
| 4,495,952 A * | 1/1985 | Klett | A61B 5/1114 |
| | | | 33/791 |
| 4,501,556 A | 2/1985 | Zelnigher | |
| 4,639,220 A | 1/1987 | Toshio et al. | |
| 4,681,539 A | 7/1987 | Knap | |
| 4,859,181 A | 8/1989 | Neumayer | |
| 5,006,065 A | 4/1991 | Waysenson | |
| 5,026,282 A | 6/1991 | Koike | |
| 5,143,086 A | 9/1992 | Duret et al. | |
| 5,320,528 A | 6/1994 | Alpern et al. | |
| 5,340,309 A | 8/1994 | Robertson | |
| 5,738,517 A | 4/1998 | Keller | |
| 5,989,023 A * | 11/1999 | Summer | A61C 19/045 |
| | | | 433/69 |
| 6,120,290 A | 9/2000 | Fukushima et al. | |
| 6,152,731 A | 11/2000 | Jordan et al. | |
| 6,152,732 A | 11/2000 | Lindekugel | |
| 6,322,359 B1 | 11/2001 | Jordan | |
| 6,558,161 B2 | 5/2003 | Nagata | |
| 6,726,479 B2 | 4/2004 | Tremont | |
| 7,048,539 B2 * | 5/2006 | Mack | A61C 19/045 |
| | | | 433/73 |
| 7,182,737 B2 * | 2/2007 | Kim | A61C 19/045 |
| | | | 600/587 |
| 7,347,690 B2 | 3/2008 | Jordan | |
| 7,433,810 B2 | 10/2008 | Pavloskaia et al. | |
| 8,021,149 B2 | 9/2011 | Gutman et al. | |
| 8,348,667 B2 | 1/2013 | Evenson | |
| 8,556,626 B2 | 10/2013 | Evenson | |
| 8,834,157 B2 | 9/2014 | Evenson et al. | |
| 10,098,714 B2 * | 10/2018 | Kuo | A61B 1/24 |
| 2002/0048741 A1 | 4/2002 | Jordan et al. | |
| 2008/0057466 A1 | 3/2008 | Jordan et al. | |
| 2008/0261168 A1 | 10/2008 | Gutman et al. | |
| 2008/0261169 A1 | 10/2008 | Gutman et al. | |
| 2009/0068618 A1 | 3/2009 | Lang | |
| 2011/0027745 A1 | 2/2011 | Evenson | |
| 2011/0217674 A1 | 9/2011 | Hanewinkel et al. | |
| 2013/0130195 A1 | 5/2013 | Evenson | |
| 2014/0106294 A1 | 4/2014 | Evenson et al. | |
| 2015/0072314 A1 * | 3/2015 | Evenson | A61C 19/052 |
| | | | 433/214 |
| 2018/0147039 A1 * | 5/2018 | Carlson | A61B 5/00 |

FOREIGN PATENT DOCUMENTS

| | | |
|---|---|---|
| WO | WO-2008080235 A1 | 7/2008 |
| WO | WO-2016196335 A1 | 12/2016 |
| WO | 2019079566 | 4/2019 |

OTHER PUBLICATIONS

"International Application Serial No. PCT/US2018/056469, International Search Report dated Feb. 1, 2019", 3 pgs.
"International Application Serial No. PCT/US2018/056469, Written Opinion dated Feb. 1, 2019", 6 pgs.

* cited by examiner

SYSTEMS AND METHODS FOR RECORDING MANDIBULAR MOVEMENT

PRIORITY APPLICATIONS

This application claims the benefit of priority under 35 U.S.C. 119(e) to U.S. Provisional Application No. 62/574,536, filed on Oct. 19, 2017, which application is incorporated herein by reference in its entirety.

DETAILED DESCRIPTION

Figure 1:
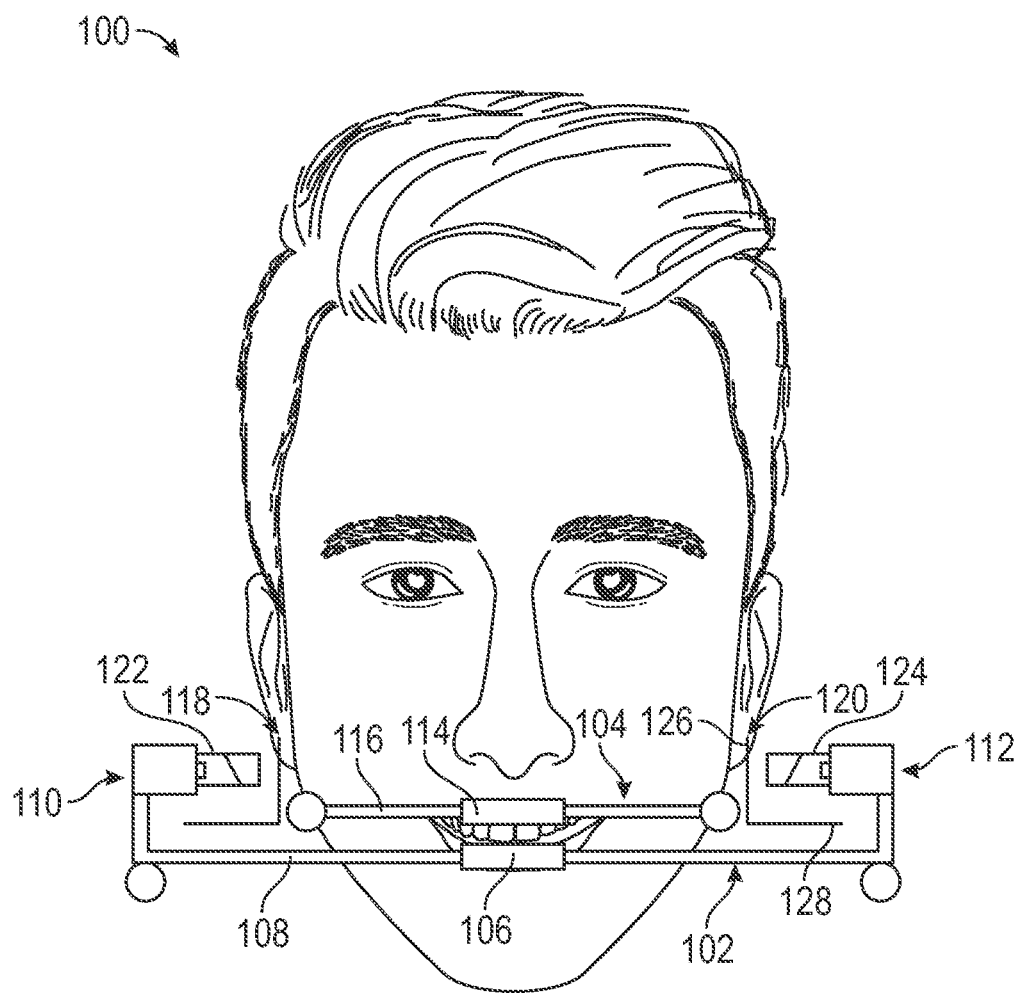
FIGS. 1 and 2 depict an example mandibular movement recording (MMR) system in accordance with this disclosure.

Dentistry has commonly sought instrumentation and technologies to treat the dental occlusion with a higher level of accuracy. Effective major or comprehensive occlusal treatment can benefit from recording and simulation of mandibular movement using the physiologic axis of rotation of the mandible in order to provide proper care. Currently available instruments and technologies may not provide enough accuracy for locating and recording the actual physiologic axis of rotation of the mandible and for recording and simulating mandibular movement in relation to the axis. However, the advent of digital instruments and technologies presents an opportunity to provide occlusal treatment with a much higher level of accuracy.

Numerous dental treatments are accomplished with direct intra-oral procedures without the need for or use of special laboratory procedures or other technologies. However, many dental treatments involve the use of materials and procedures that need the use of laboratory techniques or other augmenting technologies. Some of the dental occlusion treatments that necessarily involve the use of instruments and special technologies include crowns, bridges, partial and full dentures, splint therapy, implants, orthodontics and orthognathic surgery.

Prior to the advent of digital technologies, the primary laboratory procedures for occlusal treatment have been estimated face bow transfer instruments and dental articulators. The primary tasks that these instruments performed were to transfer the estimated spatial relation of the maxillary teeth and the axis of rotation of the mandible in the condyles to an articulator designed to simulate mandibular movement. These instruments have not provided an accurate simulation of physiologic occlusal function. The face bow transfer procedure involved transferring an estimated axis of rotation location with a device that fits into the ear or it involved another mechanical axis locating device that was marginally accurate.

At least some previous efforts to locate the axis of rotation of the mandible and record mandibular movement have involved recording movement of the mandibular condyles in a manner that provided paper or wax tracings of the condylar movement paths. Articulators were designed in the general shape of a mandible and the spatial relation of the maxillary teeth and the axis of rotation could be mechanically transferred to the articulator such that the axis was centered on "condylar elements" that represented the mandibular condyles. The maxillary and mandibular teeth could then be opened and closed on what was accepted as the axis of rotation. In addition, the condylar elements could be mechanically programmed to follow the paper or wax movement tracings thereby transferring the movement of the condyles to movement of the teeth when one member of the articulator was moved in relation to the other member.

Over the years, a more accurate occlusal treatment has been accomplished when a pantograph was used to more accurately locate the axis of rotation and transfer the spatial relation of the maxillary teeth and the axis of rotation and when a fully adjustable articulator was used. However, a significant degree of error has still been involved since the process involved mechanical instruments. A considerable amount of time and effort was needed for the clinician to adjust the occlusal surfaces of an occlusal treatment such as a crown to realize a satisfactory functional occlusion since the estimated axis of rotation resulted in different occlusal contacts than are realized during physiologic closing into occlusion.

More recent experiences with digital procedures indicate a significant improvement in accuracy can be realized. The advent of 3D digital dental scanners, optoelectronic devices, computerized milling equipment and other digital technologies may now make it possible to facilitate procedures, save time and realize a higher level of accuracy. However, even using these advanced digital devices and techniques, accurately modeling actual patient physiology, e.g. actual axis of rotation and actual occlusion, has proved challenging.

One challenge with these systems is accurately recording, measuring, or estimating the physiologic axis of rotation of the mandible. If the instrument relies on measuring a trace of an arc centered on the axis of rotation, the construction of the device and attachment to the patient can be challenging. For example, the device may become large, insufficiently rigid, and uncomfortable or impractical for patients to wear. Additionally, there is some question as to the best or most accurate place to record occlusal movement and to accurately measure the axis of rotation. For example, the farther away from the axis an arc about the axis is measured, the more arc segments can be used in a mathematical estimation of the location of the axis and thereby the greater the resolution of this estimation. However, the instrument that records the occlusal movement of a patient may become larger and more cumbersome as the measured arc moves farther away from the axis of rotation.

Examples according to this disclosure include a device/instrument and methods thereof for locating or estimating the location of the actual physiologic axis of rotation of the mandible and recording data indicative of mandibular movement. Example devices can be used to simulate actual patient mandibular movement using either a mechanical/electromechanical articulator or to simulate the movement using a digital model represented by a digital device, e.g. a computer. Example devices are also capable of and configured to locate the axis of rotation by capturing and recording digital data indicative of the axis location from two different physiological regions of patient anatomy. Additionally, example devices employ a frame (sometimes referred to as "face bow") including a number of features to support and adjustably locate the position/movement indicating components employed to capture and record data indicative of the location of the axis of rotation and/or movement of patient dentition. Moreover, example devices employ position sensitive diode sensors to record data indicative of axis location and/or mandibular movement, which sensors provide a number of advantages relative to other optoelectronic position/movement sensing devices, including reduced size, improved resolution and response speed.

Examples according to this disclosure are directed to systems and methods for recording and simulating mandibular movement. In one example, a clutch apparatus includes a mandibular clutch device and a maxillary clutch device. The mandibular clutch device includes a mandibular clutch configured to be affixed to mandibular teeth, a mandibular face bow connected to the mandibular clutch, and first and second collimated light sources (for example, lasers) connected to respective ends of the mandibular face bow. The maxillary clutch device includes a maxillary clutch configured to be affixed to maxillary teeth, a maxillary face bow connected to the maxillary clutch, and first and second position-sensitive diodes (PSDs) connected to respective ends of the maxillary face bow. Each of the mandibular and maxillary face bow is posteriorly-anteriorly adjustable to position the first and second light sources and the first and second PSDs in a plurality of positions. For example, the mandibular and maxillary face bows may be posteriorly-anteriorly, and/or vertically adjusted to position the first and second light sources and the first and second PSDs proximate right and left bicuspid regions or proximate the actual physiologic axis of rotation of the mandible.

One example according to this disclosure is directed to a clutch apparatus includes a mandibular clutch device and a maxillary clutch device. The mandibular clutch device includes a mandibular clutch configured to be affixed to mandibular teeth, a mandibular face bow connected to the mandibular clutch, a first set of first and second collimated light sources configured to be connected to the mandibular face bow, and a second set of first and second collimated light sources configured to be connected to the mandibular face bow. The maxillary clutch device includes a maxillary clutch configured to be affixed to maxilla teeth, a maxillary face bow connected to the maxillary clutch, a first set of first and second position-sensitive diodes (PSDs) configured to be connected to the maxillary face bow, and a second set of first and second PSDs configured to be connected to the maxillary face bow. The first set of first and second collimated light sources, when connected to the mandibular face bow, are configured to position the first and second light sources proximate right and left bicuspid regions. The second set of first and second collimated light sources, when connected to the mandibular face bow, are configured to position the first and second light sources proximate the actual physiologic axis of rotation of the mandible. The first set of first and second PSDs, when connected to the maxillary face bow, are configured to position the first and second PSDs proximate right and left bicuspid regions. The second set of first and second PSDs, when connected to the maxillary face bow, are configured to position the first and second PSDs proximate the actual physiologic axis of rotation of the mandible.

Figure 2:
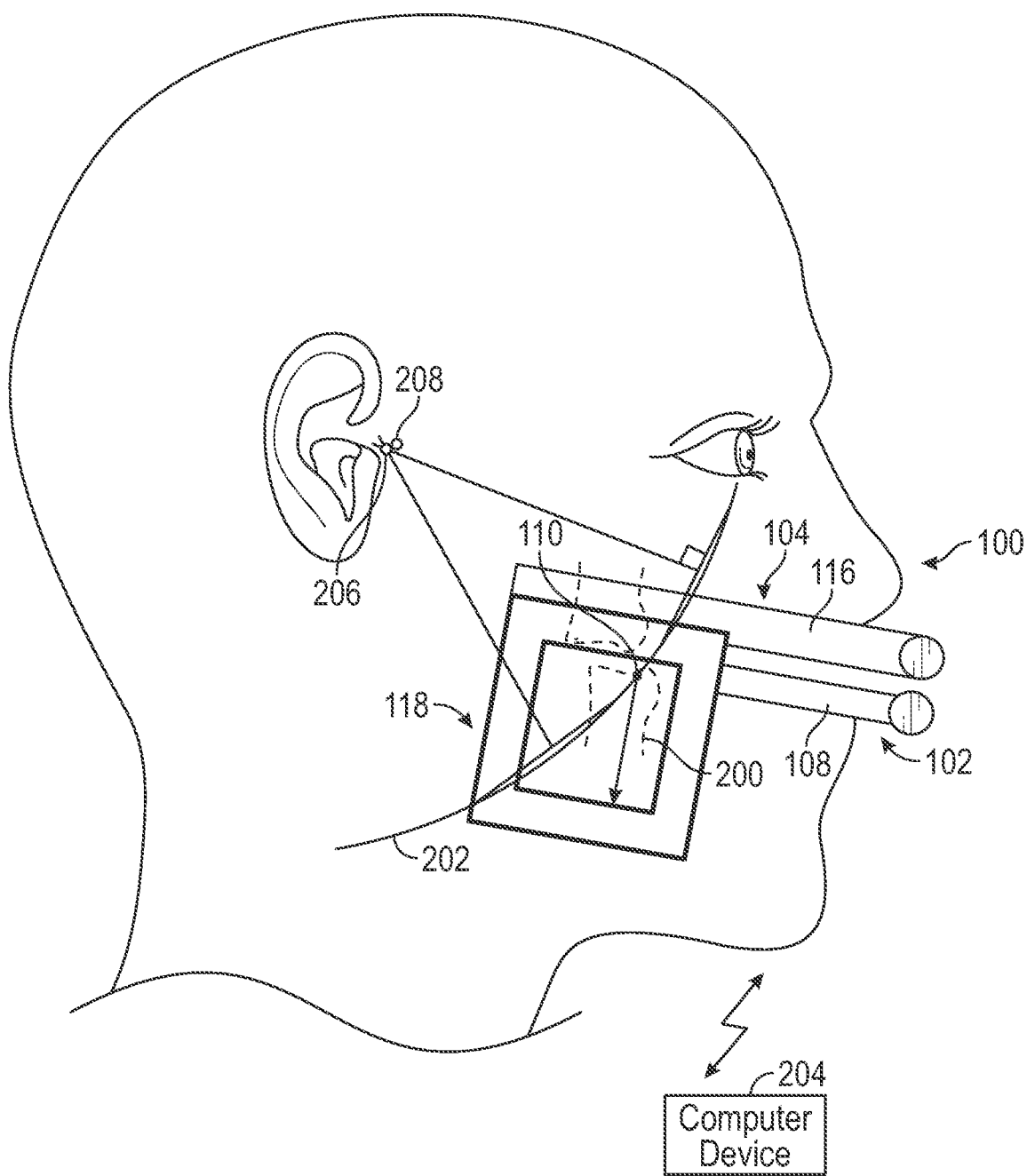

FIGS. 1 and 2 depict an example system for recording mandibular movement. FIG. 1 is a front elevation view depicting an example clutch apparatus c attached to a patient. FIG. 2 is a side elevation view depicting clutch apparatus 100 attached to the patient. In FIGS. 1 and 2, clutch apparatus 100 includes mandibular clutch device 102 and maxillary clutch device 104. Mandibular clutch device 102 includes mandibular clutch 106 affixed to the mandible of the patient, mandibular face bow 108 connected to mandibular clutch 106, and first and second collimated light sources 110 and 112 connected to respective ends of mandibular face bow 108. Maxillary clutch device 104 includes maxillary clutch 114 affixed to the maxilla of the patient, maxillary face bow 116 connected to maxillary clutch 114, and first and second photo-sensitive diodes (PSDs) 118 and 120 connected to respective ends of maxillary face bow 116.

All of the components of clutch apparatus 100 are connected to the head of the patient. In other words, the light source that moves in connection with and correspondence to movement of the mandible and the sensor that captures and records the movement of the light are both rigidly connected to the head of the patient via mandibular and maxillary clutch devices. Thus, the coordinate system/reference frame that can be reliably used to measure/locate the physiologic axis of rotation of the mandible and/or mandibular movement excludes or automatically adjusts for irrelevant movements of the head of the patient, which, in practice, are inevitable as the patient undergoes treatments.

Right and left (may also be referred to more generally as first and second) light sources 110 and 112 include a device that generates a collimated light source, for example, including a laser, and beam splitters 122 and 124, respectively. Additionally, right and left (may also be referred to more generally as first and second) PSDs 118 and 120 each include two PSD sensors 126 and 128 perpendicular to one another. Beam splitters 122 and 124 split the respective collimated light sources 110 and 112 into two perpendicular directions to cast light onto the two perpendicular PSD sensors 126 and 128 and, in this manner, are able to capture and record data/signals that is indicative of both opening and closing of the mandible about the axis of rotation, protrusion, and also lateral or left/right (medial/lateral) excursions of the mandible. When example devices are affixed to a patient and the patient is in a customary body position, for example seated upright, each of the two right and left PSD sensors 126 and 128 are generally positioned vertically and horizontally, as depicted in the view of FIGS. 1 and 2.

Clutch apparatus 100 including mandibular clutch device 102 and maxillary clutch device 104 may also include one or a plurality of fiducials. As will be described and depicted in more detail with reference to FIGS. 3-5, a number of fiducials may be employed to transfer recorded mandibular movement/data indicative of such movement to a digital model that may be manipulated and accurately simulate the actual patient dentition and occlusal and other movement thereof.

Referring to FIG. 2, clutch apparatus 100 is schematically depicted capturing data that is indicative of mandibular movement. In FIG. 2, the right side of clutch apparatus 100, including mandibular clutch device 102 and maxillary clutch device 104, is depicted. The bicuspid region of the mouth of the patient is represented by molars 200, and, as is depicted, light source 110 and PSD 118 are positioned proximate the bicuspid region. The movement of the mandible of the patient causes the mandibular clutch device 102 to move, along with which light source 110 moves. As light source 110 moves it traces an arc 202 onto PSD 118. In particular, light source 110 strikes PSD 118 at a plurality of positions thereon, as the mandible and mandibular clutch device 102 moves. PSD 118 senses the plurality of signals of light source 110 corresponding to the plurality of positions thereof and records these signals as coordinates (e.g., x, y). Computing device 204 connected to and/or configured to receive data recorded by PSD 118 can then execute an algorithm (may also be referred to as program, software, etc.) that mathematically fits a curve to these coordinates to generate an approximation of arc 202. Additionally, the algorithm can extrapolate/extend arc 202 beyond the physical bounds of PSD 118.

Arc 202, which is calculated/determined based on data indicative of mandibular movement captured by PSD 118, can then be used to estimate the physiologic axis of rotation of the mandible of the patient. Estimation of the mandibular axis of rotation can be done in multiple ways. For example, computing device 204 connected to and/or configured to receive data recorded by PSD 118 can execute an algorithm that approximates a circle including arc 202 and can then determine the location of the center of the circle, which estimates the mandibular axis of rotation.

In another example, which is schematically depicted in FIG. 2, computing device 204 can execute an algorithm that employs a method sometimes referred to as perpendicular bisectors. For example, the algorithm selects two different points on arc 202 and constructs the perpendicular bisector of the line between the two points. The algorithm then selects another two points on arc 202 and constructs the perpendicular bisector of the line between the second set of two points on arc 202. The point at which the perpendicular bisectors intersect, which is depicted in FIG. 2 as point 206, approximates the mandibular axis of rotation. In FIG. 2, the actual physiologic axis of rotation of the mandible is depicted as point 208, while the intersection of perpendicular bisectors at point 206 approximates the axis of rotation. In some cases, points 206 and 208 may be coincident and the approximation of the physiological axis, indicated as point 206 may be close to or coincident with the actual location of the physiological axis, indicated as point 208. For example, if an axis locating procedure was accomplished with the condyles of the patient in centric relation, in theory the approximate physiological axis 206 could be located at the actual physiological axis 208.

The algorithm for approximating/estimating the mandibular axis of rotation using perpendicular bisectors can execute a plurality of iterations of the method described above to calculate/determine a plurality of different estimations of the mandibular axis of rotation. The algorithm executed by computing device 204 can then execute an optimization or other routine to determine the best estimate of the axis of rotation from the plurality of calculated estimates.

Clutch apparatus 100 is selectively adjustable to position the location/movement detection components thereof (e.g., light sources 110, 112 and PSDs 118, 120) proximate to the bicuspid region or proximate the actual physiologic axis of rotation of the mandible of a patient. There may be advantages, in some applications and/or situations, to approximate the mandibular axis of rotation by capturing and recording data indicative of mandibular movement proximate to the bicuspid region, while, in other applications and/or situations, it may be advantageous to capture and record this data proximate to the actual physiologic axis of rotation. For example, in the event mandibular movement will be simulated using a digital model generated by and represented on a computing device, it may be advantageous to estimate the mandibular axis of rotation by capturing and recording data indicative of mandibular movement proximate to the bicuspid region. However, in the event the mandibular movement is simulated using a mechanical/electromechanical articulator, it may be advantageous to capture and record the data proximate the actual physiological axis.

FIG. 2 depicts clutch apparatus 100 positioned to capture and record data indicative of mandibular movement proximate the bicuspid region. Example clutch apparatus 100 can be selectively adjusted, however, to position light sources 110, 112 and PSDs 118, 120 proximate to the actual physiological axis of rotation 208. In particular, mandibular clutch device 102 can be adjusted to move light sources 110, 112 anteriorly-posteriorly into a plurality of positions. Similarly, maxillary clutch device 104 can be adjusted to move PSDs 118, 120 anteriorly-posteriorly into a plurality of positions. In practice, a dental clinician can adjust the position of light sources 110, 112 and PSDs 118, 120 such that light sources 110, 112 are within the field of PSDs 118, 120 and the field of PSDs includes the actual physiological axis of rotation 208.

In examples in which clutch apparatus 100 captures and records data indicative of mandibular movement proximate the actual physiological axis of rotation 208, the clinician adjusts the position of light sources 110, 112 and PSDs 118, 120 by adjusting mandibular face bow 108 and maxillary face bow 116. The dental clinician makes the adjustments until the light sources 110, 112 are within the field of PSDs 118, 120 and the field of PSDs includes the actual physiological axis of rotation 208. The clinician then instructs the patient to open and close their mouth. As long as light sources 110, 112 move through and PSDs 118, 120 capture data approximating an arc, clutch apparatus 100 is positioned proximate to but not on the actual physiological axis of rotation 208 and further position adjustments are needed.

In one example, computing device 204 receives and processes the data captured by PSDs and outputs values by which to adjust the position of light sources 110, 112 and PSDs 118, 120 to move light sources 110, 112 closer to the actual physiological axis of rotation 208. In another example, the clinician visually inspects light sources 110, 112 cast onto PSDs 118, 120 to determine what further adjustments are needed. Once light sources 110, 112 stay in a fixed or approximately a fixed position, i.e. a point or an approximation of a point in space, as the patient opens and closes the mandible, this fixed position is an approximation of the actual physiological axis of rotation 208, which is measured by PSDs and can be stored by computing device 204. In this example, algorithms to calculate/determine the circle including arc 202 or perpendicular bisectors, and then to calculate/determine the estimated axis of rotation 206 therefrom are not required, as the estimate of the actual physiological axis of rotation 208 is measured directly through multiple steps of repositioning light sources 110, 112 and PSDs 118, 120.

The present inventor(s) recognize, inter alia, that position-sensitive diodes (sometimes referred to as photo-sensitive diodes) may be particularly advantageous for dental instruments and methods of use thereof in accordance with the examples of this disclosure. There are a variety of devices that can be used to capture and record mandibular movement, but PSDs may have a number of advantages over other devices. Position-sensitive devices (sometimes referred to as position sensitive detectors) are optical position sensors that measure the position of a spot or point of light in one or multiple dimensions. Position sensitive devices are sometimes divided into two classes, examples of which operate according to different principles. In one class, the sensor includes an array of discrete sensors in a raster-like structure on the sensor surface/face, which array supply local discrete data readings/signals. A second class of sensors have an isotropic sensor surface that supplies continuous position data. Position-sensitive diodes (which is abbreviated herein as PSDs) belong to the second class of position-sensitive devices/detectors.

PSDs are optoelectronic position sensors utilizing photodiode surface resistance. Unlike discrete element detectors such as CCD or CMOS, PSDs provide continuous position data (e.g., x, y coordinate data) and feature high position resolution and high-speed response. Until recently, however, the cost, performance, and/or size of PSD sensors may not have been practical for use in dental instruments in the same or similar category as examples according to this disclosure.

PSDs may have additional advantages over other types of position sensor technologies, including those that employ cameras to capture the position/movement of a light source. PSDs are capable of measuring the position/movement of the light directly and, without programmatic processing record/signal the position in coordinates. Systems employing cameras as sensors, however, may require additional processing to translate the image captured by the camera into coordinate positions of the light source within the image. PSD sensors are also relatively compact, e.g., on the order of 20 millimeters square, which can have a substantial benefit in the rigidity and comfort of example devices in accordance with this disclosure.

A variety of particular PSD sensors can be employed in examples according to this disclosure. In one example, PSD sensors may be two-dimensional PSD sensors from First Sensor AB of Berlin, Germany, part no. 500066, DL400-7-THD.

Referring again to FIG. 2, computing device 204 can include hardware, software, and combinations thereof to implement the functions attributed to the controller herein. System computing device 204 can be an analog, digital, or combination analog and digital controller including a number of components. As examples, computing device 204 can include ICB(s), PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

Computing device 204 can include one or more storage devices for storing data captured by clutch apparatus 100. Storage devices, in some examples, are described as a computer-readable storage medium. In some examples, storage devices include a temporary memory, meaning that a primary purpose of one or more storage devices is not long-term storage. Storage devices are, in some examples, described as a volatile memory, meaning that storage devices do not maintain stored contents when the computer is turned off. Examples of volatile memories include random access memories (RAM), dynamic random access memories (DRAM), static random access memories (SRAM), and other forms of volatile memories known in the art. The data storage devices can be used to store program instructions for execution by processor(s) of computing device 204 and to store data used as input to and/or generated as out of such program instructions. The storage devices, for example, are used by software, applications, algorithms, as examples, running on and/or executed by computing device 204. The storage devices can include short-term and/or long-term memory, and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories.

Computing device 204 can be configured to communicate with clutch apparatus 100 and components thereof, e.g., PSDs 118, 120, via various wired or wireless communications technologies and components using various public and/or proprietary standards and/or protocols. For example, a power and/or communications network of some kind may be employed to facilitate communication between computing device 204 and apparatus 100. In one example, computing device 204 may communicate with clutch apparatus 100 via a private or public local area network (LAN), which can include wired and/or wireless elements functioning in accordance with one or more standards and/or via one or more transport mediums. In one example, clutch apparatus 100 can be configured to use wireless communications according to one of the 802.11 or Bluetooth specification sets, or another standard or proprietary wireless communication protocol. Data transmitted to and from components of apparatus 100, including computing device 204, can be formatted in accordance with a variety of different communications protocols. For example, all or a portion of the communications can be via a packet-based, Internet Protocol (IP) network that communicates data in Transmission Control Protocol/Internet Protocol (TCP/IP) packets, over, for example, Category 5, Ethernet cables or over an 802.11 or Bluetooth wireless connection.

Computing device 204 can include one or more programs, circuits, algorithms or other mechanisms for use in association with clutch apparatus 100. For example, computing device 204 can be configured to execute an algorithm to calculate/determine the estimated mandibular axis of rotation 206.

Figure 3:
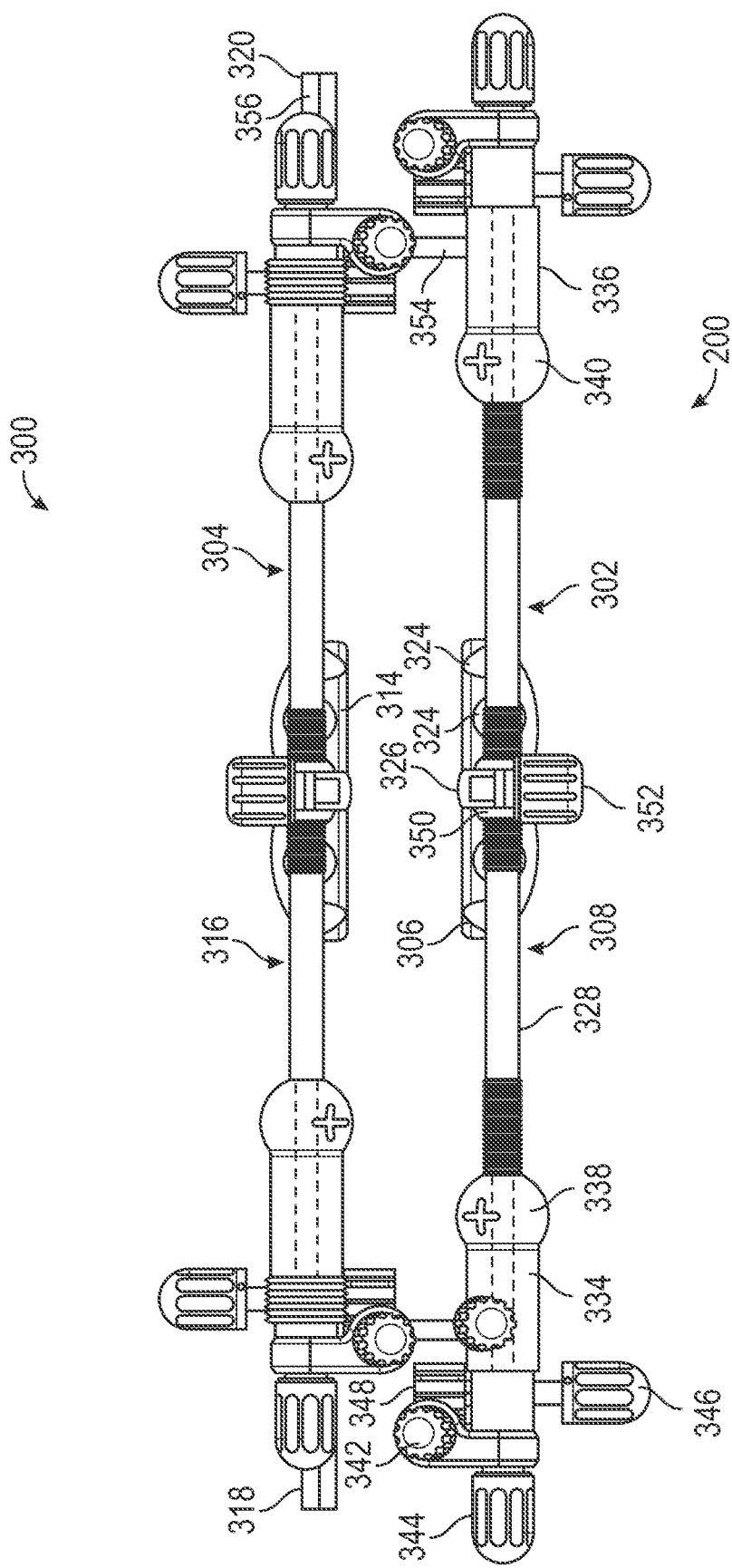
FIGS. 3-5 depict an example clutch apparatus in accordance with this disclosure.
Figure 4:
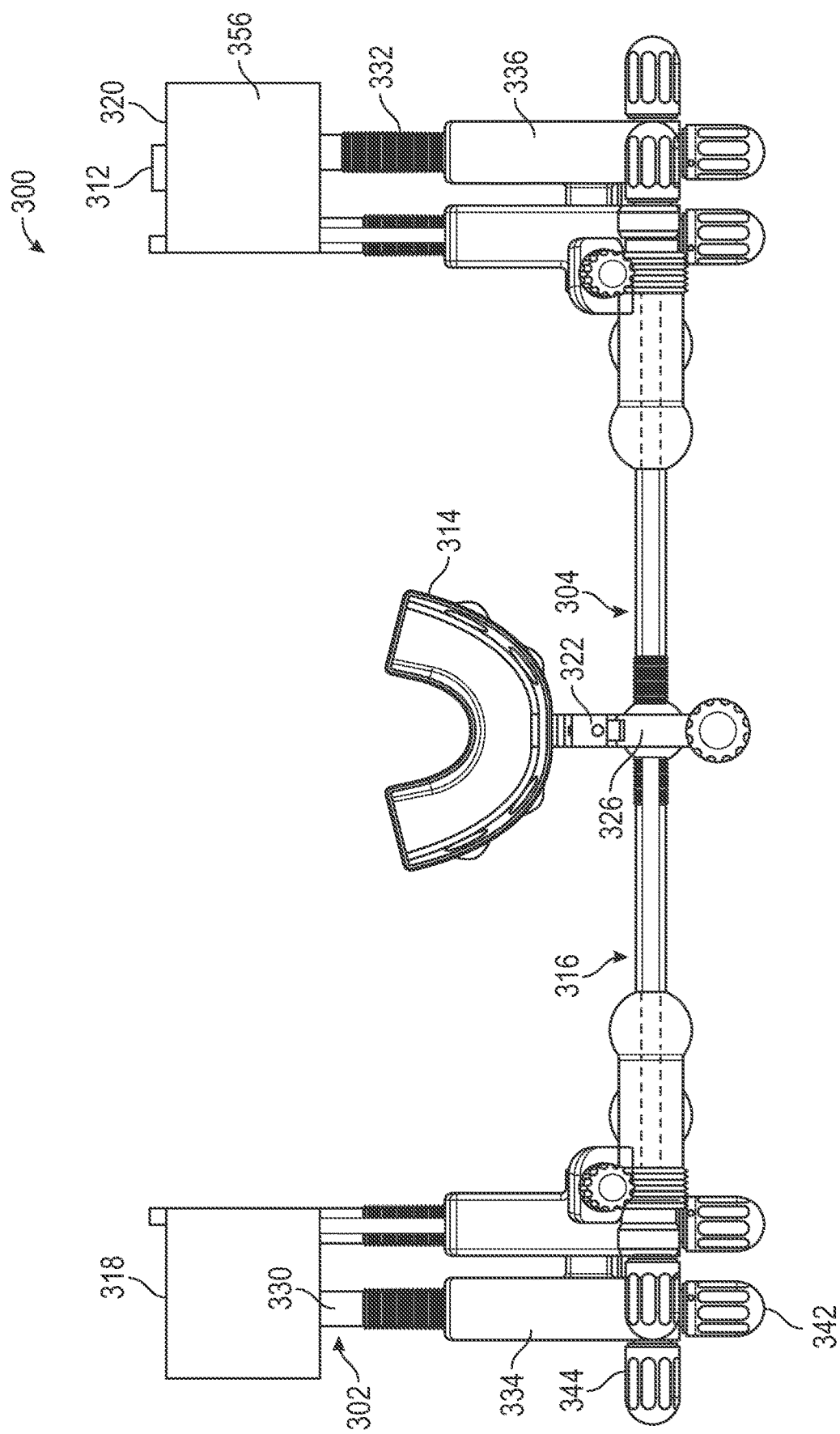
Figure 5:
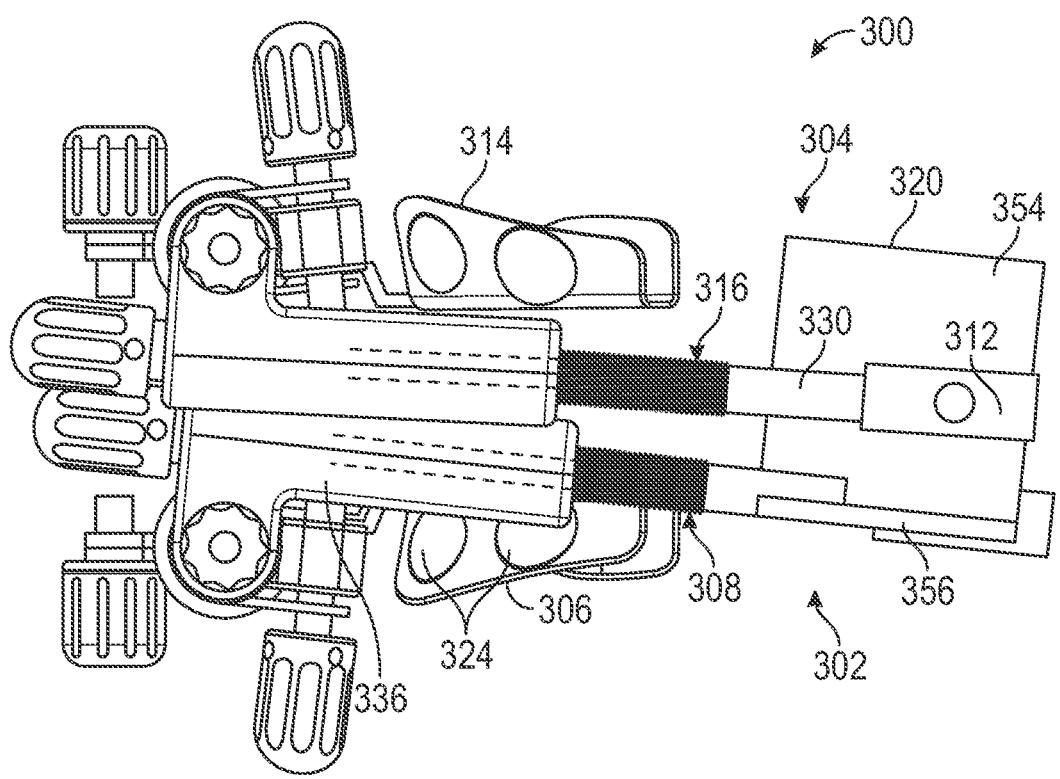

FIGS. 3-5 depict another example clutch apparatus 300 in accordance with this disclosure. Clutch apparatus 300 is similar in structure and function to clutch apparatus 100 and the foregoing description of such structures and functions of apparatus 100 applies to apparatus 300. Clutch apparatus 300 includes mandibular clutch device 302 and maxillary clutch device 304. Mandibular clutch device 302 includes mandibular clutch 306, mandibular face bow 308, and right and left (may also be referred to more generally as first and second) light sources 310, 312. Maxillary clutch device 304 includes maxillary clutch 314, maxillary face bow 316, and right and left (may also be referred to more generally as first and second) PSDs 318, 320.

Mandibular clutch 306 includes a clutch configured to receive and be affixed to the mandible of a patient. Mandibular clutch 306 also includes clutch extension 322, which extends anteriorly from the clutch. Additionally, mandibular clutch 306 includes a plurality of fiducials 324 formed integral with or attached to the clutch.

Mandibular face bow 308 includes clutch extension clamp 326, crossbar 328, and right and left (may also be referred to more generally as first and second) anterior-posterior (AP) bars 330, 332. Mandibular face bow 308 also includes right and left (may also be referred to more generally as first and second) anterior-posterior, medial-lateral (APML) adjustment clamps 334, 336. Clutch extension clamp 326 is connected on one end to clutch extension 322 and is connected on the opposite end to crossbar 328. Crossbar 328 is connected on one end to right APML clamp 334 and on the opposite end to left APML clamp 336. Right AP bar 330 is connected on one end to right APML clamp 334. Right light source 310 is connected to the end of right AP bar 330 opposite right APML clamp 334. Left AP bar 332 is connected on one end to left APML clamp 336. Left light source 312 is connected to the end of left AP bar 332 opposite left APML clamp 336.

Right APML clamp 334 includes fiducial 338 and left APML clamp 336 includes fiducial 340. Fiducials 336 and 340 are semi-spherical and are centrally aligned with an axis of crossbar 328.

Mandibular clutch device 302 is relatively compact and lightweight, while still be sufficiently rigid to prevent undesirable flexing between clutch 306 and light sources 310, 312 and having a high degree of adjustability. In one example, right and left APML clamps 334 and 336 are identical. In other examples, right and left APML clamps 334 and 336 are different clamps with different mechanisms for selectively adjusting the position of light sources 310, 312 and PSDs 318, 320. In the example of FIGS. 3-5, right and left APML clamps 334 and 336 are identical and thus details of the structure and function of these clamps will be described only with respect to one of the clamps.

Right APML clamp 334 connects crossbar 328 to right AP bar 330 and also allows adjustment of right light source 310 anteriorly-posteriorly and medial-laterally. APML clamp 334 includes two adjustment knobs 342 and 344, which, when actuated/operated, move light source 310 anteriorly-posteriorly and medial-laterally, respectively. In other examples, adjustment clamps 334, 336 may include user input controls other than knobs. Additionally, APML clamp 334 allows AP bar 330 to rotate relative to and about crossbar 328. By actuating adjustment knobs 342 and 344, a dental clinician can move light source 310 to proximate a bicuspid region or proximate an actual physiologic axis of rotation of the mandible of a variety of patients and can also adjust the medial-lateral position of AP bar 330 and light source 310 to allow mandibular clutch device 302 to fit comfortably on a number of different patients.

A variety of mechanisms may be used to be able to selectively adjust the position of light source 310 by moving AP bar 330 and crossbar 328 using APML clamp 334. In one example, each of the AP and ML adjustments using knobs 342 and 344 employs a similar mechanism. For example, AP bar 330 is received into and threadingly engaged with APML clamp 334. The end of AP bar 330 is threaded to an inner cylindrical sleeve inside the outer cylindrical sleeve/housing visible in FIGS. 4 and 5. The inner cylindrical sleeve is rotatable relative to the outer sleeve/housing, and is connected to knob 342 and has an inside thread/threaded hole that is configured to receive the threaded end of AP bar 330. By simply rotating knob 342 in one of two directions, AP bar 330 and light source 310 connected thereto move anteriorly or posteriorly. The medial-lateral movement of light source 310 using knob 344 can be structured and function in a similar manner. APML clamp 334 can include one or more locks, actuated by lock knob(s) 346 and 348, which can function to fully lock down APML clamp 334 connected to AP bar 330 and crossbar 328 and thereby secure/lock the position of light source 310.

In addition to the adjustability of APML clamp 334 (and the counterpart second APML clamp 336), clutch extension clamp 326 and the structure of crossbar 328 connected thereto provide a number of degrees of freedom of movement to mandibular clutch device 302. In general, and as depicted in FIGS. 3-5, crossbar 328 includes integral therewith or connected thereto spherical portion 350, in this example, arranged at or proximate to the middle of crossbar 328. Spherical portion 350 configured to be received in and to rotate in a plurality of directions/dimensions relative to clutch extension clamp 326. A thumb or manually actuated screw/bolt 352 can be actuated to lock crossbar 328 in position.

Similar to the example of FIGS. 1 and 2, right and left (may also be referred to more generally as first and second) light sources 310 and 312 include a device that generates a collimated light source, for example, including a laser, and beam splitters to split the beam from the single light source into two beams. Additionally, right and left (may also be referred to more generally as first and second) PSDs 318 and 320 each include two PSD sensors 354 and 356 perpendicular to one another, which is best illustrated in FIG. 5. Referring to FIG. 5, the beam splitter of light source 312 is configured to split the beam along two perpendicular directions to cast light onto the two perpendicular PSD sensors 354 and 356, which, in this manner, are able to capture and/or record data/signals indicative of both opening and closing of the mandible about the axis of rotation, protrusion, and also lateral or left/right (medial/lateral) excursions of the mandible.

As noted above, maxillary clutch device 304 includes maxillary clutch 314, maxillary face bow 316, and right and left (may also be referred to more generally as first and second) PSDs 318, 320. Maxillary clutch 314 includes a clutch configured to receive and be affixed to the mandible of a patient. Maxillary clutch 314 also includes a clutch extension, which extends anteriorly from the clutch. Additionally, maxillary clutch 314 includes a plurality of fiducials formed integral with or attached to the clutch.

Maxillary face bow 316 includes a clutch extension clamp, a crossbar, and right and left (may also be referred to more generally as first and second) anterior-posterior (AP) bars. Maxillary face bow 316 also includes right and left (may also be referred to more generally as first and second) anterior-posterior, medial-lateral (APML) adjustment clamps. The clutch extension clamp of maxillary face bow 316 is connected on one end to the clutch extension and is connected on the opposite end to the crossbar. The crossbar of maxillary face bow 316 is connected on one end to the right APML clamp and on the opposite end to the left APML clamp of maxillary face bow 316. The right AP bar of maxillary face bow 316 is connected on one end to the right APML clamp. Right PSD 318 is connected to the end of the right AP bar of maxillary face bow 316 opposite the right APML clamp of maxillary face bow 316. The left AP bar of maxillary face bow 316 is connected on one end to the left APML clamp. Left PSD 320 is connected to the end of the left AP bar of maxillary face bow 316 opposite the left APML clamp.

The right and left APML clamps of maxillary face bow 316 each include a fiducial. Each of these fiducials are semi-spherical and are centrally aligned with an axis of the crossbar of maxillary face bow 316.

In one example, mandibular clutch device 302 and maxillary clutch device 304 are the same or substantially the same, except that mandibular clutch device 302 includes light sources 310, 312 and maxillary clutch device 304 includes PSDs 318, 320. In the example of FIGS. 3-5, mandibular clutch device 302 and maxillary clutch device 304 are the same or substantially the same in componentry, structure and function. Details of the structure and function of these devices is therefore described only with respect to mandibular clutch device 302. The foregoing detailed description of the components, structure and function of mandibular clutch device 302 applies mutatis mutandis to maxillary clutch device 304.

Clutch apparatus 300 is configured to capture and/or store data indicative of mandibular movement. For example, in a similar manner as described with reference to example clutch apparatus 100, clutch apparatus 300 is selectively adjustable to position the location/movement detection components thereof (e.g., light sources 310, 312 and PSDs 318, 320) proximate to the bicuspid region or proximate the actual physiologic axis of rotation of the mandible of a patient. For example, when apparatus 300 is affixed to dentition of a patient, movement of the mandible of the patient causes mandibular clutch device 302 to move, along with which light sources 310, 312 move. As light sources 310, 312 move the collimated light sources trace an arc onto PSDs 318, 320. In particular, light sources 310, 312 strike PSDs 318, 320, respectively, at a plurality of positions thereon, as the mandible and mandibular clutch device 302 moves. PSDs 318, 320 sense the plurality of signals of light sources 310, 312 corresponding to the plurality of positions thereof and record (or send signals/data to another device to record) these signals as coordinates (e.g., x, y). As with the example of FIG. 2, a computing device can be connected to and/or configured to receive data measured by PSDs 318, 320. The computing device can then execute an algorithm (may also be referred to as program, software, etc.) that mathematically fits curves to these coordinates to generate an approximation of arcs representing rotation of the mandible about the physiologic axis of rotation. Additionally, the algorithm can extrapolate/extend the arc beyond the physical bounds of PSDs 318, 320.

The arcs through which the mandible moves and which is calculated/determined based on data indicative of mandibular movement captured by PSDs 318, 320, can then be used to estimate the physiologic axis of rotation of the mandible of the patient. Estimation of the mandibular axis of rotation can be done in multiple ways. For example, the computing device can execute an algorithm that approximates a circle including the arc and can then determine the location of the center of the circle, which estimates the mandibular axis of rotation.

In another example, the computing device can execute an algorithm that employs a method sometimes referred to as perpendicular bisectors. For example, the algorithm selects two different points on the arc recorded by PSDs 318, 320 and constructs the perpendicular bisector of the line between the two points. The algorithm then selects another two points on the arc and constructs the perpendicular bisector of the line between the second set of two points on the arc. The point at which the perpendicular bisectors intersect approximates the mandibular axis of rotation.

The algorithm for approximating/estimating the mandibular axis of rotation using perpendicular bisectors can execute a plurality of iterations of the method described above to calculate/determine a plurality of different estimations of the mandibular axis of rotation. The algorithm executed by the computing device can then execute an optimization or other routine to determine the best estimate of the axis of rotation from the plurality of calculated estimates.

Example clutch apparatus 300 can be selectively adjusted to position light sources 310, 312 and PSDs 318, 320 proximate to the actual physiological axis of rotation or the bicuspid region of the mouth of a patient. For example, a clinician can adjust mandibular clutch device 302 to move light sources 310, 312 anteriorly-posteriorly and vertically up and down into a plurality of positions using APML clamps 334 and 336. For example, to move light source 310 anteriorly-posteriorly, the clinician can rotate adjustment knob 342. Additionally, the clinician can rotate AP bar 330 relative to and about crossbar 328 to move light source 310 up and down (or two other opposite directions, e.g. first and second directions, depending upon the orientation of the patient to which the apparatus is connected). In practice, a dental clinician can adjust the position of light sources 310, 312 and PSDs 318, 320 such that light sources 310, 312 are within the field of PSDs 318, 320 and the field of the PSDs includes the actual physiological axis of rotation or the bicuspid region.

In an example in which clutch apparatus 300 captures and records data indicative of mandibular movement proximate the actual physiological axis of rotation, the clinician adjusts the position of light sources 310, 312 and PSDs 318, 320 by adjusting mandibular face bow 308 and maxillary face bow 316 using the APML clamps and/or clutch extension clamp 322. The dental clinician makes the adjustments until the light sources 310, 312 are within the field of PSDs 318, 320 and the field of PSDs includes the actual physiological axis of rotation. The clinician then instructs the patient to open and close their mouth. As long as light sources 310, 312 move through and PSDs 318, 320 capture data approximating an arc, clutch apparatus 300 is positioned proximate to but not on the actual physiological axis of rotation and further position adjustments are needed.

In one example, the computing device can receive and process the data captured by PSDs 318, 320 and output values by which to adjust the position of light sources 310, 312 and PSDs 318, 320 to move light sources 310, 312 closer to the actual physiological axis of rotation. In another example, the clinician visually inspects light sources 310, 312 cast onto PSDs 318, 320 (which may be represented on a larger computer screen/display connected to a computing device connected to the PSDs) to determine what further adjustments are needed. Once light sources 310, 312 stay in a fixed or approximately a fixed position, i.e. a point or an approximation of a point in space, as the patient opens and closes the mandible, this fixed position is an approximation of the actual physiological axis of rotation, which is measured by PSDs 318, 320 and can be stored by the computing device. In this example, algorithms to calculate/determine the circle including an arc or perpendicular bisectors, and then to calculate/determine the estimated axis of rotation therefrom are not required, as the estimate of the actual physiological axis of rotation is measured directly through multiple steps of repositioning light sources 310, 312 and PSDs 318, 320.

Figure 6A:
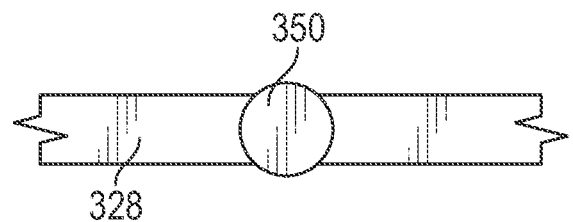
FIGS. 6A-6C depict an example clamp and crossbar of a clutch apparatus in accordance with this disclosure.
Figure 6B:
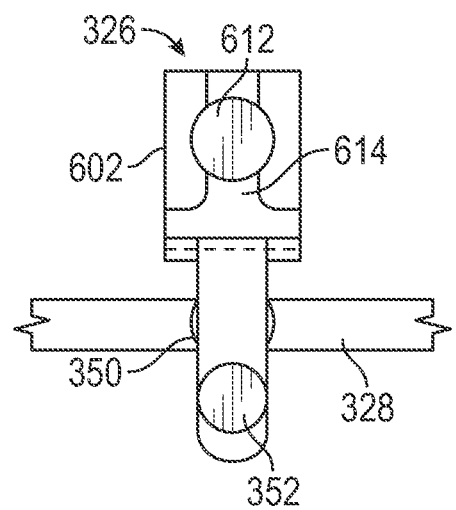
Figure 6C:
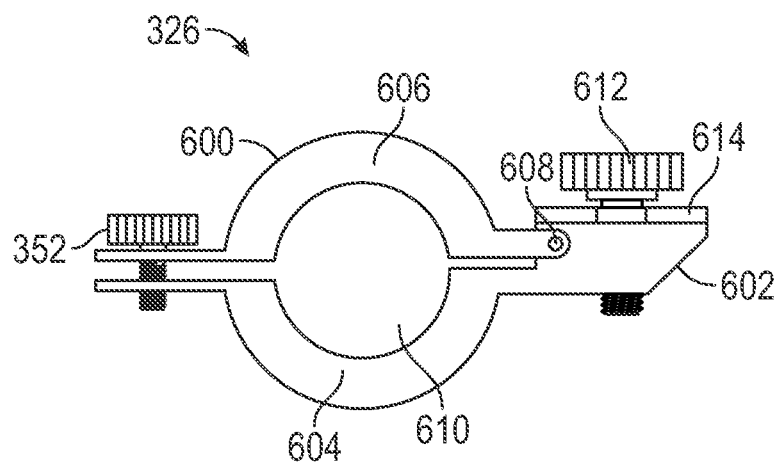

FIGS. 6A-6C depict clutch extension clamp 326 and crossbar 328. In FIG. 6A, crossbar 328 includes integral therewith or connected thereto spherical portion 350, in this example, arranged at or proximate to the middle of crossbar 328. Spherical portion 350 is configured to be received in and to rotate in a plurality of directions/dimensions relative to clutch extension clamp 326.

In FIGS. 6B and 6C, clutch extension clamp 326 includes a semi-spherical clamp 600 and a tongue clamp 602. Semi-spherical clamp 600 is configured to receive spherical portion 350 of crossbar 328. Tongue clamp 602 is configured to receive clutch extension 322 (or the corresponding clutch extension of maxillary clutch device 304).

Semi-spherical clamp 600 includes bottom portion 604 and top portion 606. Bottom portion 604 is integral with tongue clamp 602 in the example of FIGS. 6B and 6C. However, in other examples, bottom portion 604 of semi-spherical clamp 600 could be separate from and connected to tongue clamp 602. Top portion 606 is pivotally connected to bottom portion 604 of semi-spherical clamp at hinge 608. Interior surfaces of bottom portion 604 and top portion 606 form semi-spherical pocket 610, which is configured to receive spherical portion 350 of crossbar 328.

Lock bolt 352 of semi-spherical clamp 600 connects to the end of the clamp opposite hinge 608. In operation, lock bolt 352 can be removed and top portion 606 can be pivoted to open semi-spherical clamp 600. Spherical portion 350 of crossbar 328 can be seated in the lower half of semi-spherical socket 610 in bottom portion 604 and then top portion 606 can be pivoted closed and lock bolt 352 reconnected and tightened to secure the crossbar in the clamp. Before locking crossbar 328 in position, lock bolt 352 can be connected but not tightened to allow crossbar 328 to be oriented in a plurality of orientations by rotating spherical portion 350 in semi-spherical pocket 610. After crossbar 328 is at the desired position/orientation, lock bolt 352 can be tightened to lock the crossbar in place.

Tongue clamp 602 includes lock bolt 612 and tongue 614. Tongue 614 protrudes from a middle portion of one face of tongue clamp 602. Tongue 614 is sized and shaped to receive a complimentary flange/extension from another component, which, in the example of clutch extension clamp 326 is clutch extension 322 of mandibular clutch 306 (or the clutch extension of maxillary clutch 314). Tongue 614 is configured to receive, for example, a forked end of clutch extension 322. The forked end of clutch extension 322 straddles either side of tongue 614 and the shape of the male tongue 614 matches the shape of the fork of clutch extension 322 to align the two components. Lock bolt 612 can then be tightened to secure clutch extension 322 to tongue clamp 602 of clutch extension clamp 326.

Figure 7A:
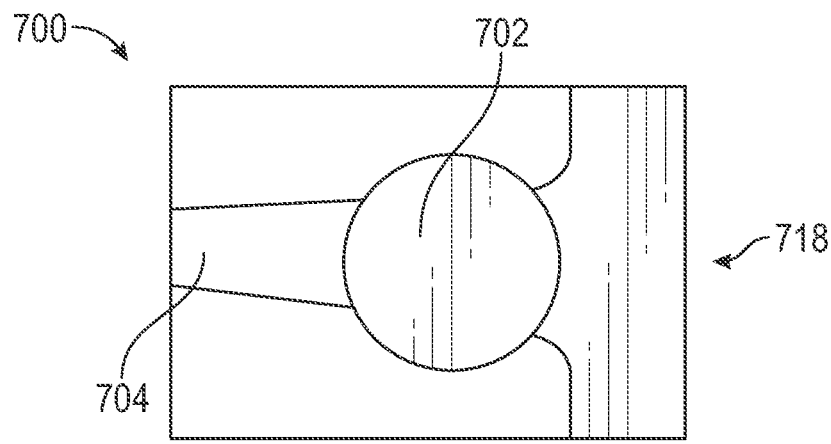
FIGS. 7A-7D depict a number of components of a clutch apparatus (mandibular and maxillary) in accordance with this disclosure including an example clamp that can be used to couple the components to an example clutch apparatus.

FIGS. 7A-7D depict a number of components of a clutch apparatus (mandibular and maxillary) in accordance with this disclosure and an example clamp that can be used to couple the components to an example clutch apparatus. FIG. 7A depicts tongue clamp 700, which is similar to tongue clamp 602 of clutch extension clamp 326. However, tongue clamp 700 is a standalone clamp, not including another clamp like semi-spherical clamp 600. Tongue clamp 700 can be used to connect various components in example clutch apparatus (mandibular and maxillary) in accordance with this disclosure. Tongue clamp 700 includes lock bolt 702 and tongue 704.

Figure 7B:
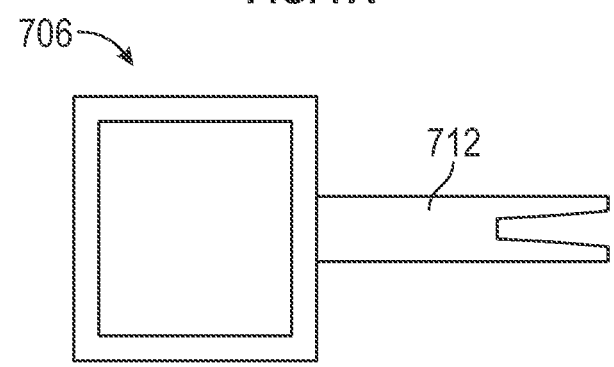
Figure 7C:
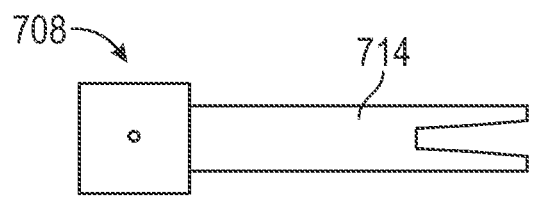
Figure 7D:
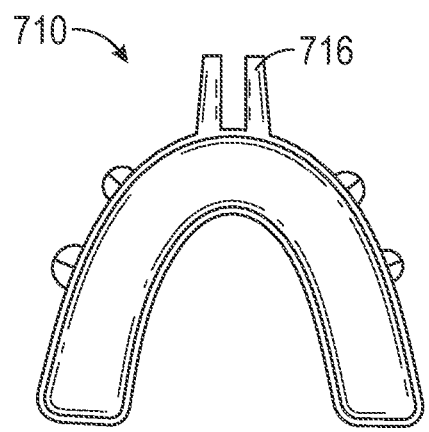

FIGS. 7B-7C depict PSD 706, light source 708, and clutch 710, respectively. PSD 706 includes forked extension 712. Light source 708 includes forked extension 714. And, clutch 710 includes forked extension 716. Tongue 704 of tongue clamp 700 is configured to receive, for example, the forked end of each of forked extensions 712, 714, and 716 of PSD 706, light source 708, and clutch 710, respectively. The forked end of each of extensions 712, 714, and 716 is configured to straddle either side of tongue 704 and the shape of the male tongue 704 matches the shape of the fork of each extension to align the components to one another. Lock bolt 702 can then be tightened to secure any of extensions 712, 714, and 716 and thereby any of PSD 706, light source 708, and clutch 710, respectively, to tongue clamp 700.

Tongue clamp 700 and any of PSD 706, light source 708, and clutch 710 connected thereto can be connected to example clutch apparatus/devices (mandibular and maxillary) in a variety of ways. For example, tongue clamp 700 can included a threaded hole configured to receive a threaded end of one of the AP bars of a mandibular or maxillary face bow of a mandibular or maxillary clutch device. In one example, face 718, which is generally opposite from the direction from which PSD 706, light source 708, or clutch 710 extends when connected, can included a threaded hole configured to threadably engage/be engaged by a threaded end of an AP bar of a face bow.

Figure 8:
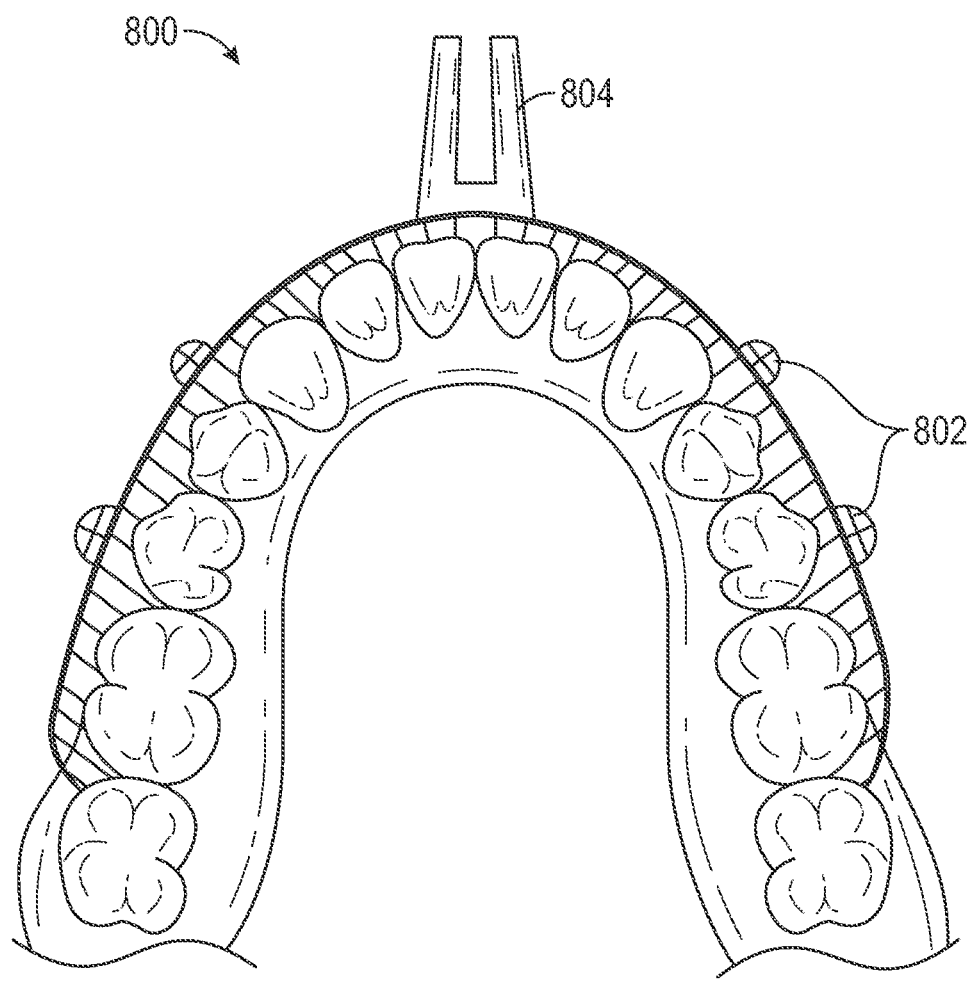
FIG. 8 schematically depicts an example custom clutch.

In the foregoing examples in accordance with this disclosure, clutches are employed to affix an instrument for measuring/recording mandibular axis of rotation and/or mandibular movement. Such clutches, for example, clutches 106, 114, 306 and/or 314 can be affixed to maxillary and mandibular teeth with a securing agent such as polyvinylsiloxane or another suitable material. Example clutches 306 and 314 configured such that the clutches cover the occlusal surfaces of the teeth. However, in other examples according to this disclosure, custom clutches may be configured to attach to the sides of the teeth such that the patient can bring the teeth into occlusion without interference. An example custom clutch 800 is schematically depicted in FIG. 8. Clutch 800 can include, as with other example clutches, a number of fiducials 802 and forked clutch extension 804. Clutch 800 however is a custom fabricated component configured to fit and be coupled to the sides of the teeth such that the patient can bring the teeth into occlusion without interference.

Some patients experience mandibular growth variations resulting in the mandible being positioned such that the midline is considerably off center to the right or left. This circumstance complicates the use of a custom clutch, as the midline of the teeth (which is the midline of a custom clutch configured to fit thereto) is offset laterally right or left. In this situation, a conventional clutch that covers the teeth and allows orientation of the clutch so the connector is closer to the midline may be indicated. When a conventional clutch that covers the occlusal surfaces is used, it may be necessary to adjust the position of the clutch so the midline of the clutch is not aligned with the midline of the teeth, in order to align the clutch extension to the clutch apparatus/device (e.g., to the mandibular face bow), which, in turn will improve the proper alignment of the position/movement recording system (e.g., light sources and PSDs).

Figure 9:
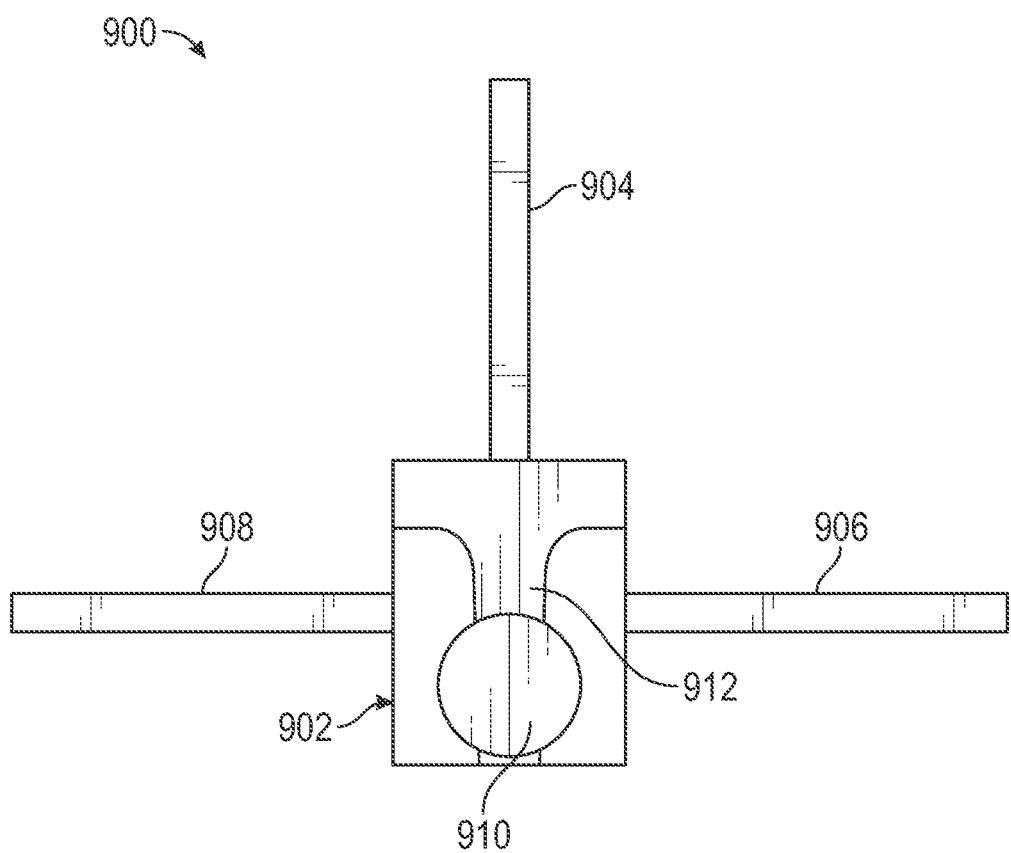
FIG. 9 depicts an example clutch alignment device.

The present inventors have therefore devised a clutch alignment/calibration device that can be used to align conventional clutches affixed to dental arches with mandibular growth variations of the kind described above. FIG. 9 depicts example clutch alignment device 900. Clutch alignment device 900 includes tongue clamp 902, anterior bar 904, and first and second lateral bars 906 and 908. When in position relative to a clutch preliminarily positioned on teeth of a patient, tongue clamp 902 is arranged medially and anterior bar 904 extends anteriorly from tongue clamp 902. First lateral bar 906 extends laterally from tongue clamp 902 in a first direction, e.g., right, and second lateral bar 908 extends laterally from tongue clamp 902 in a second direction opposite the first direction, e.g., left.

Tongue clamp 902 includes lock bolt 910 and tongue 912. Tongue 912 protrudes from a middle portion of one face of tongue clamp 902. Tongue 912 is sized and shaped to receive a complimentary flange/extension a clutch, e.g., forked extension 716 of clutch 710. Tongue 912 is configured to receive the forked end of the clutch extension. The forked end of the clutch extension straddles either side of tongue 912 and the shape of the male tongue 912 matches the shape of the fork of clutch extension to align the two components. Lock bolt 910 can then be tightened to secure clutch extension and clutch to tongue clamp 902.

Although example clutch alignment device 900 employs tongue clamp 902 to couple the device to a clutch with a forked clutch extension, in other example clutch alignment devices in accordance with this disclosure, different devices can be used to connect the alignment device to the clutch.

In operation, a dental clinician preliminarily places a mandibular clutch on teeth of the patient and couples alignment device 900 to the clutch (or the alignment device is attached to the clutch and the clutch is adjustably affixed to the teeth). The dental clinician then visually inspects anterior bar 904 and moves the mandibular clutch and alignment device 900 until anterior bar 904 of clutch alignment device 900 is directed straight from the patient to the anterior. When the securing agent for the mandibular clutch has hardened, a second clutch alignment device 900 is attached to a maxillary clutch. The maxillary clutch is then affixed to the maxillary teeth and oriented so the anterior bar and first and second lateral bars of the maxillary clutch alignment device are parallel to the anterior bar and first and second lateral bars of the mandibular clutch alignment device in both the horizontal and vertical planes. This will improve proper coordination of the upper and lower data recording components.

Figure 10:
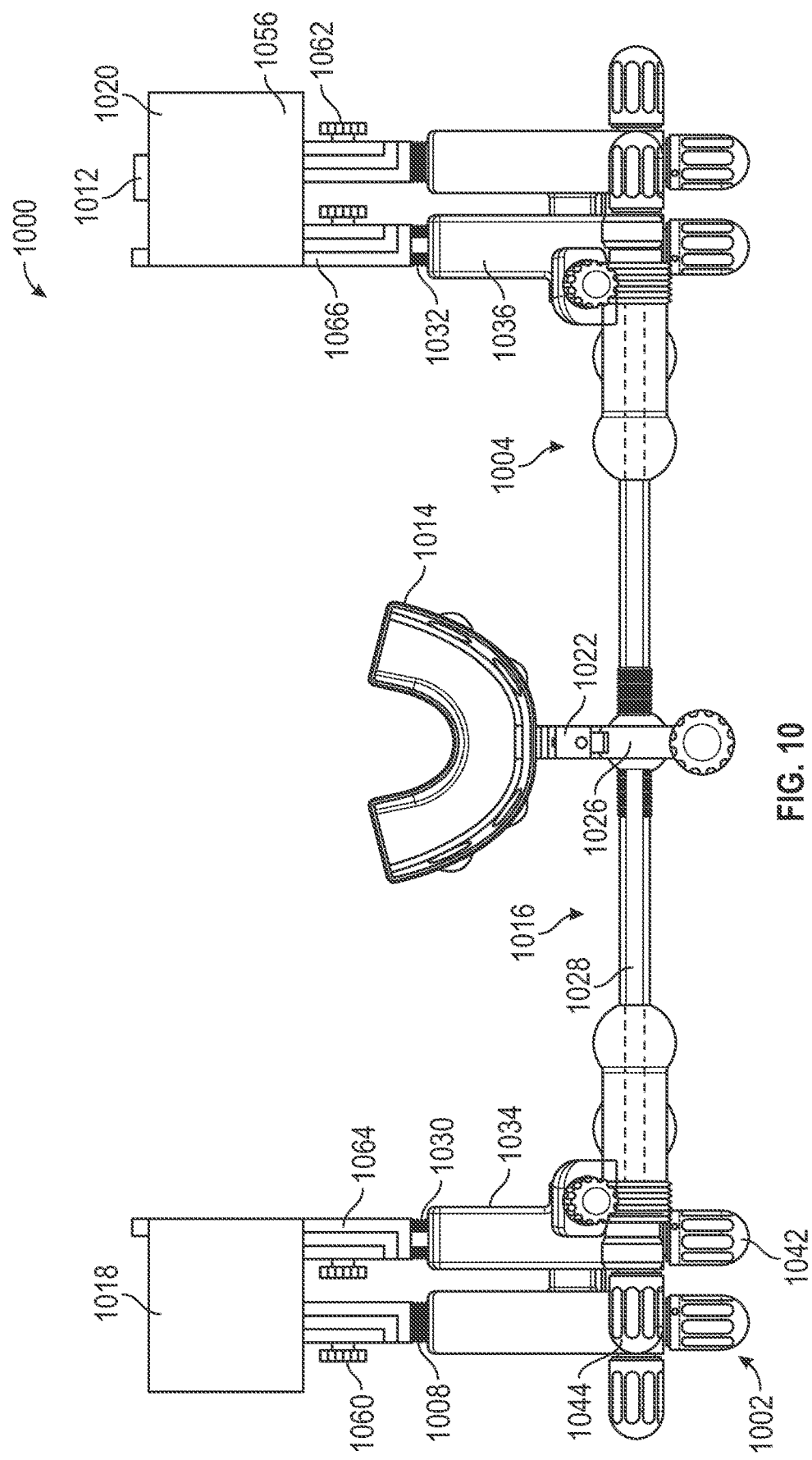
FIGS. 10 and 11 depict an example clutch apparatus in accordance with this disclosure.
Figure 11:
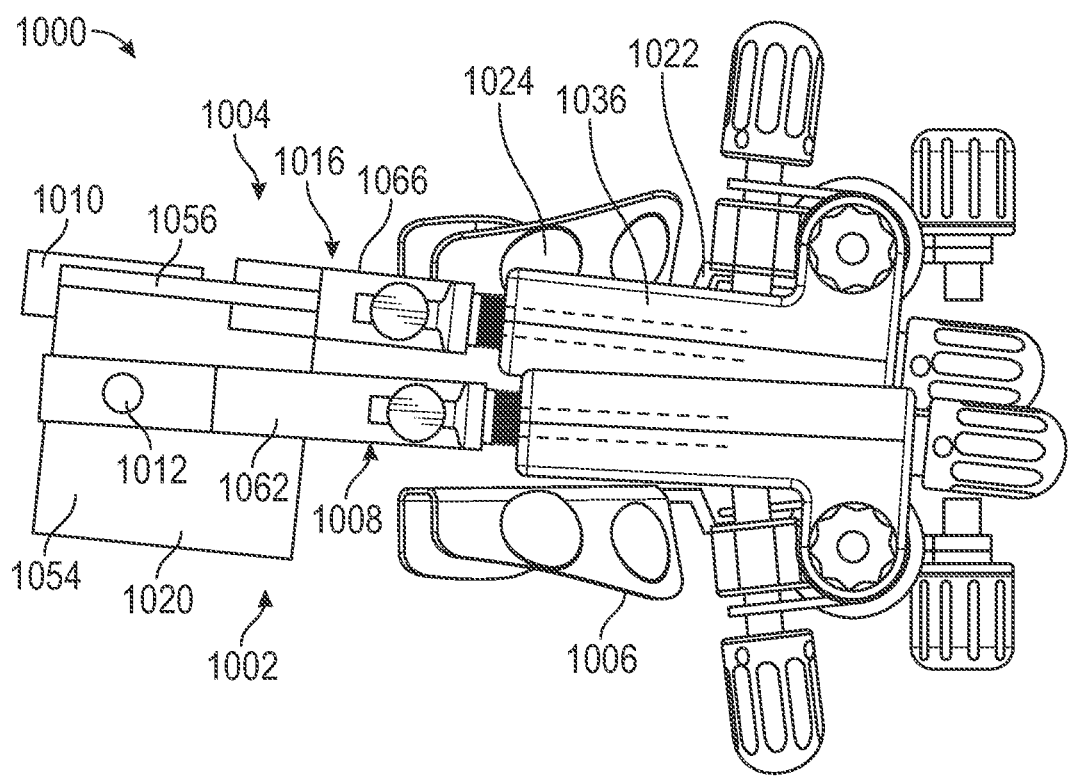

FIGS. 10 and 11 depict another example clutch apparatus 1000 in accordance with this disclosure. Clutch apparatus 1000 includes mandibular clutch device 1002 and maxillary clutch device 1004. Mandibular clutch device 1002 includes mandibular clutch 1006, mandibular face bow 1008, and right and left (may also be referred to more generally as first and second) light sources 1010, 1012. Maxillary clutch device 1004 includes maxillary clutch 1014, maxillary face bow 1016, and right and left (may also be referred to more generally as first and second) PSDs 1018, 1020.

In one example, mandibular clutch device 1002 and maxillary clutch device 1004 are the same or substantially the same, except that mandibular clutch device 1002 includes light sources 1010, 1012 and maxillary clutch device 1004 includes PSDs 1018, 1020. In the example of FIGS. 10 and 11, mandibular clutch device 1002 and maxillary clutch device 1004 are the same or substantially the same in componentry, structure and function. Details of the structure and function of these devices is therefore described only with respect to mandibular clutch device 1002. The following detailed description of the components, structure and function of maxillary clutch device 1004 applies mutatis mutandis to mandibular clutch device 1002.

Maxillary clutch 1014 includes a clutch configured to receive and be affixed to the mandible of a patient. Mandibular clutch 1014 also includes clutch extension 1022, which extends anteriorly from the clutch. Additionally, mandibular clutch 1006 includes a plurality of fiducials 1024 formed integral with or attached to the clutch.

Maxillary face bow 1016 includes clutch extension clamp 1026, crossbar 1028, and right and left (may also be referred to more generally as first and second) anterior-posterior (AP) bars 1030, 1032. Maxillary face bow 1008 also includes right and left (may also be referred to more generally as first and second) anterior-posterior, medial-lateral (APML) adjustment clamps 1034, 1036. Clutch extension clamp 1026 is connected on one end to clutch extension 1022 and is connected on the opposite end to crossbar 1028. Crossbar 1028 is connected on one end to right APML clamp 1034 and on the opposite end to left APML clamp 1036.

Clutch apparatus 1000 is similar in structure and function to clutch apparatus 300 and the foregoing description of such structures and functions of apparatus 300 applies to apparatus 1000. However, in the example of clutch apparatus 1000, the anterior-posterior adjustment of light sources 1010, 1012 and PSDs 1018, 1020 is implemented in a different manner than in apparatus 300. In particular, light sources 1010, 1012 are coupled to AP bar to mandibular face bow 1008 by right and left tongue clamps 1060, 1062, and PSDs 1018, 1020 are coupled to maxillary face bow 1016 by right and left tongue clamps 1064, 1066. Additionally, as described in more detail below, clutch apparatus 1000 is configured to employ two sets of light sources 1010, 1012 and PSDs 1018, 1020, the respective sets including fork extensions connected between the light sources or PSDs and the respective tongue clamps and having a different lengths.

In the case of maxillary clutch device 1004, for example, right AP bar 1030 is connected on one end to right APML clamp 1034 and on the other end to right tongue clamp 1064. Right PSD 1018 is connected to right tongue clamp 1064. Similarly, left AP bar 1032 of maxillary clutch device 1004 is connected on one end to left APML clamp 1036 and on the other end to left tongue clamp 1066. Left PSD 1020 is connected to left tongue clamp 1066.

Tongue clamps 1060-1066 can be substantially similar in structure and function to tongue clamp XXX of clutch extension clamp 326 and tongue clamp 700. For example, each of tongue clamps 1060-1066 can include a tongue like tongue 1070 of left tongue clamp 1066 of maxillary clutch device 1004. The shape of the male tongue 1070 matches the shape of a fork of the extension of PSD 1010. A lock bolt like lock bolt 1072 of left tongue clamp 1066 can be tightened to secure the forked extension of and thereby also secure PSD 1010 to maxillary clutch device 1004.

Tongue clamps 1060-1066 allow the use of multiple sets of light sources and PSDs, which include different length forked extensions, which thereby allows a clinician to select one set of light sources and extensions and one set of PSDs and extensions to position these position/movement indicating components proximate bicuspid regions of the patient and the clinician can select another set of light sources and extensions and another set of PSDs and extensions to position the components proximate the actual physiologic axis of rotation, as an example of the multiple positions/locations into which light sources and respective PSDs can be positioned using example clutch apparatus 1000.

Figure 12A:
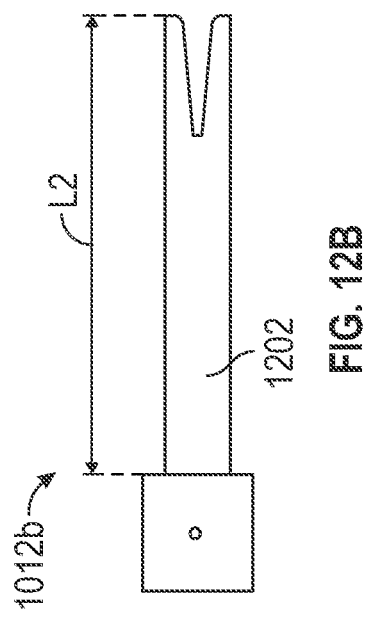
FIGS. 12A and 12B depict example light source devices including different length forked extensions.
Figure 12B:
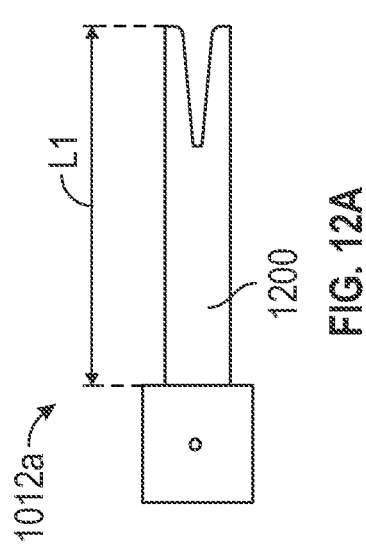
Figure 12C:
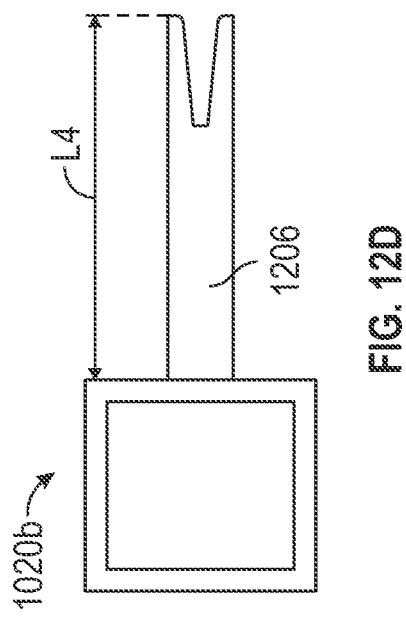
FIGS. 12C and 12D depict example position sensitive diodes including different length forked extensions.
Figure 12D:
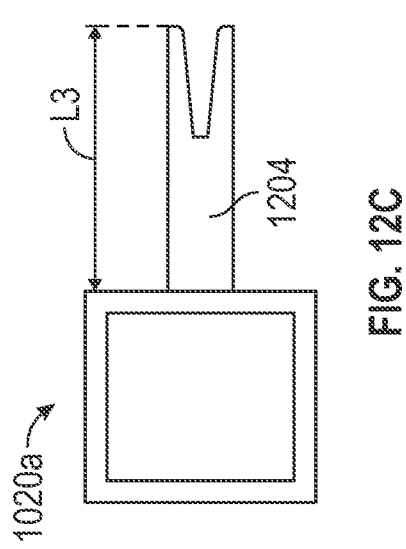

As an example of the anterior-posterior adjustability of light sources 1010, 1012 and PSDs 1018, 1020 of clutch apparatus 1000, FIGS. 12A-12B depict two example light sources 1012a and 1012b and two example PSDs 1020a and 1020b. In FIGS. 12A-12B, light source 1012a includes forked extension 1200 and light source 1012B includes forked extension 1202. Forked extension 1200 has a length, L1, which is less than the length, L2, of forked extension 1202. Similarly, PSD 1020a includes forked extension 1204 and PSD 1020b includes forked extension 1206. Forked extension 1204 has a length, L3, which is less than the length, L4, of forked extension 1206. The lengths, L1-L4, of light sources 1012a and 1012b and PSDs 1020a and 1020b can be selected to position these components in different positions/locations relative to patient anatomy when the components are coupled to clutch apparatus 100 via tongue clamps 1062 and 1066, respectively. Thus, light sources 1012a, 1012b and PSDs 1020a, 1020b can be employed alternatively in clutch apparatus 1000. Additionally, in this manner, a clinician can selectively position the position/movement indicating components (e.g., light sources 1010, 1012 and PSDs 1018, 1020) of clutch apparatus 1000 in multiple locations, including positioning the components proximate bicuspid regions of the patient, or, alternatively, proximate the actual physiologic axis of rotation.

The anterior-posterior adjustability of the position of light sources 1010, 1012 and PSDs 1018, 1020 of clutch apparatus 1000 can also include adjustments similar to those described above with reference to clutch apparatus 300. For example, APML clamp 1034 allows adjustment of right light source 1010 anteriorly-posteriorly and medial-laterally. Referring to FIG. 10, APML clamp 1034 includes two adjustment knobs 1042 and 1044, which, when actuated/operated, move light source 1010 anteriorly-posteriorly and medial-laterally, respectively. In other examples, adjustment clamps 1034, 1036 may include user input controls other than knobs. Additionally, APML clamp 1034 allows AP bar 1030 to rotate relative to and about crossbar 1028. By actuating adjustment knobs 1042 and 1044, a dental clinician can make fine adjustments to light source 1010, after the clinician has selected a light source with the appropriate forked extension to position the device proximate a bicuspid region or proximate an actual physiologic axis of rotation.

Right APML clamp 1034 includes fiducial 1038 and left APML clamp 1036 includes fiducial 1040. Fiducials 1036 and 1040 are semi-spherical and are centrally aligned with an axis of crossbar 1028.

Mandibular clutch device 1002 is relatively compact and lightweight, while still be sufficiently rigid to prevent undesirable flexing between clutch 1006 and light sources 1010, 1012 and having a high degree of adjustability. In one example, right and left APML clamps 1034 and 1036 are identical. In other examples, right and left APML clamps 1034 and 1036 are different clamps with different mechanisms for selectively adjusting the position of light sources 1010, 1012 and PSDs 1018, 1020. In the example of FIGS. 10 and 11, right and left APML clamps 1034 and 1036 are identical and thus details of the structure and function of these clamps will be described only with respect to one of the clamps.

Right APML clamp 1034 connects crossbar 1028 to right AP bar 1030 and also allows adjustment of right light source 1010 anteriorly-posteriorly and medial-laterally. APML clamp 1034 includes two adjustment knobs 1042 and 1044, which, when actuated/operated, move light source 1010 anteriorly-posteriorly and medial-laterally, respectively. In other examples, adjustment clamps 1034, 1036 may include user input controls other than knobs. Additionally, APML clamp 1034 allows AP bar 1030 to rotate relative to and about crossbar 1028. By actuating adjustment knobs 1042 and 1044, a dental clinician can move light source 1010 to proximate a bicuspid region or proximate an actual physiologic axis of rotation of the mandible of a variety of patients and can also adjust the medial-lateral position of AP bar 1030 and light source 1010 to allow mandibular clutch device 1002 to fit comfortably on a number of different patients.

A variety of mechanisms may be used to be able to selectively adjust the position of light source 1010 by moving AP bar 1030 and crossbar 1028 using APML clamp 1034. In one example, each of the AP and ML adjustments using knobs 1042 and 1044 employs a similar mechanism. For example, AP bar 1030 is received into and threadingly engaged with APML clamp 1034. The end of AP bar 1030 is threaded to an inner cylindrical sleeve inside the outer cylindrical sleeve/housing visible in FIGS. 4 and 5. The inner cylindrical sleeve is rotatable relative to the outer sleeve/housing, and is connected to knob 1042 and has an inside thread/threaded hole that is configured to receive the threaded end of AP bar 1030. By simply rotating knob 1042 in one of two directions, AP bar 1030 and light source 1010 connected thereto move anteriorly or posteriorly. The medial-lateral movement of light source 1010 using knob 1044 can be structured and function in a similar manner.

APML clamp 1034 can include one or more locks, actuated by lock knob(s) 1046 and 1048, which can function to fully lock down APML clamp 1034 connected to AP bar 1030 and crossbar 1028 and thereby secure/lock the position of light source 1010.

In addition to the adjustability of APML clamp 1034 (and the counterpart second APML clamp 1036), clutch extension clamp 1026 and the structure of crossbar 1028 connected thereto provide a number of degrees of freedom of movement to mandibular clutch device 1002. In general, and as depicted in FIGS. 10 and 11, crossbar 1028 includes integral therewith or connected thereto spherical portion 1050, in this example, arranged at or proximate to the middle of crossbar 1028. Spherical portion 1050 configured to be received in and to rotate in a plurality of directions/dimensions relative to clutch extension clamp 1026. A thumb or manually actuated screw/bolt 1052 can be actuated to lock crossbar 1028 in position.

Similar to the example of clutch apparatuses 100 and 300, right and left (may also be referred to more generally as first and second) light sources 1010 and 1012 include a device that generates a collimated light source, for example, including a laser, and beam splitters to split the beam from the single light source into two beams. Additionally, right and left (may also be referred to more generally as first and second) PSDs 1018 and 1020 each include two PSD sensors 1054 and 1056 perpendicular to one another. The beam splitter of light source 1012 is configured to split the beam along two perpendicular directions to cast light onto the two perpendicular PSD sensors 1054 and 1056, which, in this manner, are able to capture and/or record data/signals indicative of both opening and closing of the mandible about the axis of rotation, protrusion, and also lateral or left/right (medial/lateral) excursions of the mandible.

Clutch apparatus 1000 is configured to capture and/or store data indicative of mandibular movement. For example, in a similar manner as described with reference to example clutch apparatuses 100 and 300, clutch apparatus 1000 is selectively adjustable to position the location/movement detection components thereof (e.g., light sources 1010, 1012 and PSDs 1018, 1020) proximate to the bicuspid region or proximate the actual physiologic axis of rotation of the mandible of a patient. When apparatus 1000 is affixed to dentition of a patient and the location of light sources 1010, 1012 and PSDs 1018, 1020 have been set by selecting the light sources and PSDs with appropriate length forked extensions and, in some cases, making additional fine adjustments, movement of the mandible of the patient causes mandibular clutch device 1002 to move, along with which light sources 1010, 1012 move. As light sources 1010, 1012 move the collimated light sources trace an arc onto PSDs 1018, 1020. In particular, light sources 1010, 1012 strike PSDs 1018, 1020, respectively, at a plurality of positions thereon, as the mandible and mandibular clutch device 1002 moves. PSDs 1018, 1020 sense the plurality of signals of light sources 1010, 1012 corresponding to the plurality of positions thereof and record (or send signals/data to another device to record) these signals as coordinates (e.g., x, y). As with other examples, a computing device can be connected to and/or configured to receive data measured by PSDs 1018, 1020. The computing device can then execute an algorithm (may also be referred to as program, software, etc.) that mathematically fits curves to these coordinates to generate an approximation of arcs representing rotation of the mandible about the physiologic axis of rotation. Additionally, the algorithm can extrapolate/extend the arc beyond the physical bounds of PSDs 1018, 1020.

The arcs through which the mandible moves and which is calculated/determined based on data indicative of mandibular movement captured by PSDs 1018, 1020, can then be used to estimate the physiologic axis of rotation of the mandible of the patient. Estimation of the mandibular axis of rotation can be done in multiple ways. For example, the computing device can execute an algorithm that approximates a circle including the arc and can then determine the location of the center of the circle, which estimates the mandibular axis of rotation.

In another example, the computing device can execute an algorithm that employs a method sometimes referred to as perpendicular bisectors. For example, the algorithm selects two different points on the arc recorded by PSDs 1018, 1020 and constructs the perpendicular bisector of the line between the two points. The algorithm then selects another two points on the arc and constructs the perpendicular bisector of the line between the second set of two points on the arc. The point at which the perpendicular bisectors intersect approximates the mandibular axis of rotation.

The algorithm for approximating/estimating the mandibular axis of rotation using perpendicular bisectors can execute a plurality of iterations of the method described above to calculate/determine a plurality of different estimations of the mandibular axis of rotation. The algorithm executed by the computing device can then execute an optimization or other routine to determine the best estimate of the axis of rotation from the plurality of calculated estimates.

Example apparatus in accordance with this disclosure (e.g., clutch apparatuses 100, 300 and 1000) are configured to capture/measure/record mandibular movement (e.g., data indicative of this movement measured using PSDs and collimated light sources). After employing example devices in the manner described above or a similar manner, the data captured can be employed to model/simulate occlusal functions. Modeling/simulating occlusal functions can be done using a mechanical/electromechanical articulator or digitally on a computer.

In some examples, a clutch apparatus in accordance with this disclosure is used to locate and record coordinates of an estimate of the actual physiologic axis of rotation of the mandible of a patient by locating the position/movement recording system (collimated light sources and PSDs) proximate the actual physiologic axis of rotation. In some such examples, the digital data representing the estimate of the mandibular axis of rotation is used to configure an articulator device that can model/simulate mandibular movement, which, in turn, is used by a dental clinician to design treatments for a patient.

In one example of recording and simulating/modeling mandibular movement, a clinician can affix mandibular and maxillary clutch devices of a clutch apparatus to a patient. In one example, clutches that cover the occlusal surfaces of the patient are employed and an adhesive or cement such as polyvinylsiloxane is applied inside the clutches to attach them to the mandible and maxilla. Depending upon the dentition of the patient, the clinician may employ a clutch aligning device before attaching the clutches to face bows of each of the mandibular and maxillary clutch devices. Once the mandibular and maxillary clutch devices are attached and in place, the clinician can make an initial, rough adjustment to the position of the light sources (e.g., 310, 312) attached to one of the mandibular and maxillary clutch devices and the PSDs (e.g., 318, 320) attached to the other by adjusting the face bows (e.g., 308, 316). The dental clinician makes the adjustments until the light sources are within the field of the PSDs and the field of the PSDs includes the actual physiological axis of rotation. The clinician then instructs the patient to open and close their mouth. As long as the light sources move through and the PSDs capture data approximating an arc, clutch apparatus is positioned proximate to but not on the actual physiological axis of rotation and further position adjustments are needed.

In one example, a computing device receives and processes the data captured by the PSDs and outputs values by which to adjust the position of the light sources and PSDs to move the light sources closer to the actual physiological axis of rotation. In another example, the clinician visually inspects the light sources cast onto the PSDs (which may be represented on a larger computer screen/display connected to a computing device connected to the PSDs) to determine what further adjustments are needed. Once the light sources stay in a fixed or approximately a fixed position, i.e. a point or an approximation of a point in space, as the patient opens and closes the mandible, this fixed position is an approximation of the actual physiological axis of rotation, which is measured by the PSDs and can be stored by the computing device.

The clinician will also need to make a model of the dental arches of the patient for use on the articulator to physically model/simulate mandibular movement in order to design one or more treatments. The teeth can be modeled in a number of ways, including using molding, casting, and other techniques. The physical model of the teeth of the patient are then attached to the articulator. The measurement of and recorded data indicative of the actual physiological axis of rotation of the mandible recorded using a clutch apparatus in accordance with this disclosure is then used to model the axis in relation to the modeled teeth on the articulator. For example, the data recorded by the example clutch apparatus is employed to construct articulator guide blocks positioned at the articulator hinge location. These guide blocks are configured to cause physical model of the teeth of the patient to move into a number of occlusal positions that simulate the actual mandibular movement of the patient.

In some examples, a clutch apparatus in accordance with this disclosure is used to locate and record coordinates on an arc representing rotation of the mandible of a patient about the physiologic axis of rotation by locating the position/movement recording system (collimated light sources and PSDs) proximate the bicuspid region of the mouth of the patient. The data representing the arc along which the mandible rotates is processed to calculate/determine an estimate of the actual physiologic axis of rotation and this estimated axis along with the data representing the arc is used to fully digital model/simulation of mandibular movement, which, in turn, is used by a dental clinician to design treatments for a patient.

In one example of recording and simulating/modeling mandibular movement, a clinician can affix mandibular and maxillary clutch devices of a clutch apparatus to a patient. In one example, clutches that cover the occlusal surfaces of the patient are employed and an adhesive or cement such as polyvinylsiloxane is applied inside the clutches to attach them to the mandible and maxilla. In another example, a custom clutch that does not cover the occlusal surfaces of the teeth is employed. Depending upon the dentition of the patient, the clinician may employ a clutch aligning device before attaching the clutches to face bows of each of the mandibular and maxillary clutch devices. Once the mandibular and maxillary clutch devices are attached and in place, the clinician can make an initial, rough adjustment to the position of the light sources (e.g., 310, 312) attached to one of the mandibular and maxillary clutch devices and the PSDs (e.g., 318, 320) attached to the other by adjusting the face bows (e.g., 308, 316). The dental clinician makes the adjustments until the light sources are within the field of the PSDs and the field of the PSDs includes the bicuspid region. The clinician then instructs the patient to open and close their mouth.

For example, when the clutch apparatus is affixed to the dentition of the patient, movement of the mandible of the patient causes the mandibular clutch device to move, along with which the light sources of the mandibular clutch device move. As the light sources move, the collimated light traces an arc onto the PSDs of the maxillary clutch device of the clutch apparatus. In particular, the light sources strike the PSDs at a plurality of positions thereon, as the mandible and mandibular clutch device move. The PSDs sense the plurality of signals of the light sources corresponding to the plurality of positions thereof and record (or send signals/data to another device to record) these signals as coordinates (e.g., x, y).

A computing device can be connected to and/or configured to receive the data measured by the PSDs. The computing device can then execute an algorithm (may also be referred to as program, software, etc.) that mathematically fits curves to the coordinates to generate an approximation of arcs representing rotation of the mandible about the physiologic axis of rotation.

The arcs through which the mandible moves and which is calculated/determined based on data indicative of mandibular movement captured by the PSDs of a clutch apparatus in accordance with this disclosure, can then be used to estimate the physiologic axis of rotation of the mandible of the patient. Estimation of the mandibular axis of rotation can be done in multiple ways. For example, the computing device can execute an algorithm that approximates a circle including the arc and can then determine the location of the center of the circle, which estimates the mandibular axis of rotation.

In another example, the computing device can execute an algorithm that employs a method sometimes referred to as perpendicular bisectors. For example, the algorithm selects two different points on the arc recorded by the PSDs and constructs the perpendicular bisector of the line between the two points. The algorithm then selects another two points on the arc and constructs the perpendicular bisector of the line between the second set of two points on the arc. The point at which the perpendicular bisectors intersect approximates the mandibular axis of rotation.

The algorithm for approximating/estimating the mandibular axis of rotation using perpendicular bisectors can execute a plurality of iterations of the method described above to calculate/determine a plurality of different estimations of the mandibular axis of rotation. The algorithm executed by the computing device can then execute an optimization or other routine to determine the best estimate of the axis of rotation from the plurality of calculated estimates.

In order to construct a digital model to simulate mandibular movement, a digital model of the teeth of the patient will be needed and the data recorded with a clutch apparatus in accordance with this disclosure (which estimates the actual physiological axis of rotation and/or mandibular movement) will need to be related to the digital model of the teeth in a multi-dimensional (e.g., three dimensions) frame of reference. The process of digitally modeling/simulating mandibular movement may therefore require scanning the teeth of the patient and/or the clutch apparatus used and importing the data from the scan(s) into an algorithm to construct a digital 3-D solid model therefrom. For example, using scan data digital solid model of the mandible and maxilla of the patient is constructed on a computing device. The teeth of the patient can be scanned or otherwise digitally modeled in a number of ways.

The data estimating the axis of rotation recorded using a clutch apparatus in accordance with this disclosure is employed by an algorithm relate the estimated axis of rotation to the digital model of the teeth. For example, the algorithm may relate the estimated axis of rotation of the mandible to the clutch apparatus instrument, which is represented by scan or other data of the instrument. The algorithm can then be configured to relate the clutch apparatus to the digital model of the teeth digitally, which, in turn, allows the algorithm to relate the estimated axis of rotation to the digital model of the teeth.

After the digital model of the teeth is constructed and the teeth are located in a frame of reference along with the estimated axis of rotation, the computing device and algorithms/programs executed thereon can simulate mandibular movement about the axis and the clinician can use such simulations to design one or more treatments.

Example apparatus and methods in accordance with this disclosure may be used in conjunction with electronic imaging, 3D digital intra-oral dental scanners, a 3D digital dental platform, cone beam computed tomography (CBCT), software programs and computer functions. One important function in constructing an accurate and clinically satisfactory model to simulate mandibular movement is to relate upper and lower digital dental arch models in occlusion on a computing device in the spatial relation that occurs when the mandibular condyles are located in "centric relation," their physiologic positions in the mandibular fossae. Accomplishing this task may require 3D digital imaging/scanning of the upper and lower dental arches and importing the image/scan data onto a computing device, applying a 3D coordinate frame to the lower digital teeth, imaging the spatial relation of the upper and lower teeth or tooth forms to multiple fiducials positioned in non-linear locations on the clutches and imaging the relation of multiple fiducials on the upper and lower clutches concurrently from multiple directions when the condyles are positioned in the physiologic location in the mandibular fossae by a centric relation bite registration procedure.

One procedure for physiologically positioning the mandibular condyles in the mandibular fossae can be to accomplish a centric relation bite registration with the upper and lower clutches in place on the teeth. The centric relation bite registration may serve one or more important functions in relation to recording and simulating mandibular movement. For example, the centric relation bite registration physically places patient dentition in a "normal" starting position for observing and studying occlusal movements. Additionally, the centric relation bite registration can serve as a known/constant origin or starting position when capturing and recording data using an example clutch apparatus and also when constructing a digital model of the upper and lower dental arches and movement thereof.

A commonly used centric relation bite registration procedure is the "Lucia Jig" technique that involves having the patient bite firmly on a hard substance in the anterior with a pliant material that hardens positioned at the posterior. When the patient bites firmly on the anterior hard material the patient's closing musculature positions the condyles in "centric relation," anterior-superior positions in the mandibular fossae which is generally accepted as a normal, physiologic relation.

If conventional clutches that cover the teeth are in place, the bite registration material is positioned on the clutches and the clutches must be indexed to allow placing the bite registration materials in place in the laboratory for later imaging. If a custom clutch is used and the biting surfaces of the teeth can come into occlusion, the bite registration is taken with the registration material in contact with the teeth. If conventional clutches that cover the biting surfaces of the teeth are used, the bite registration procedure is accomplished with the bite registration material in contact with the clutches rather than the teeth. If custom clutches that do not cover the teeth are used, then tooth forms in the polyvinylsiloxane securing agent will not be available and the spatial relation imaging of the upper and lower clutches to the teeth must be accomplished in the mouth while the clutches are still affixed to the teeth.

Although an important function of example apparatuses/devices in accordance with this disclosure is to locate the "actual physiologic axis of rotation" of the mandible, it is probable that the axis actually consists of a "locus of points" and represents a clinically useable axis of rotation. Therefore, the word "actual" is intended to mean an accurate, clinically useable axis. In examples according to this disclosure, mandibular movement may be recorded by assisting the patient in moving the mandible once in a protrusive manner and twice in both right and left lateral excursions. These movements can be recorded on vertical and horizontal PSDs, e.g., PSD sensors 126, 128, 354, 356, or 1054, 1056.

Figure 13A:
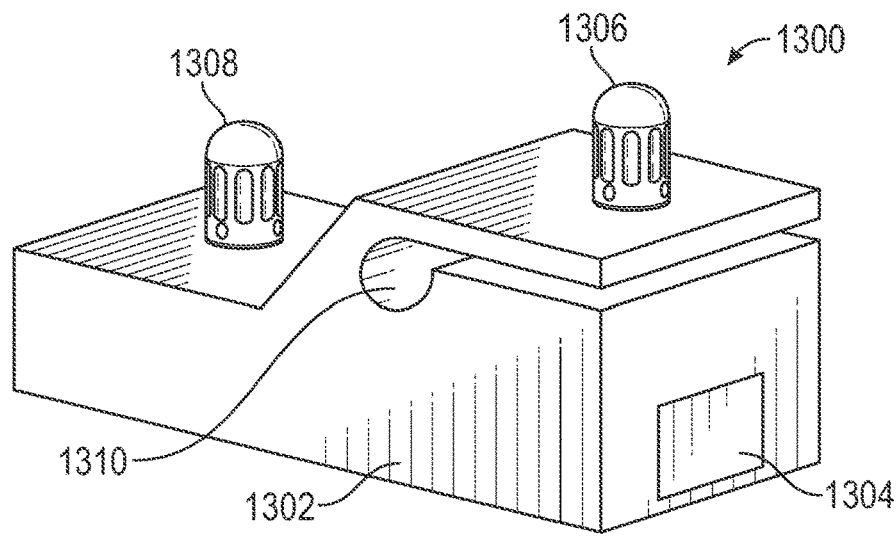
FIGS. 13A-13C depict an example clamp that can be used to couple components to an example clutch apparatus in accordance with this disclosure.
Figure 13B:
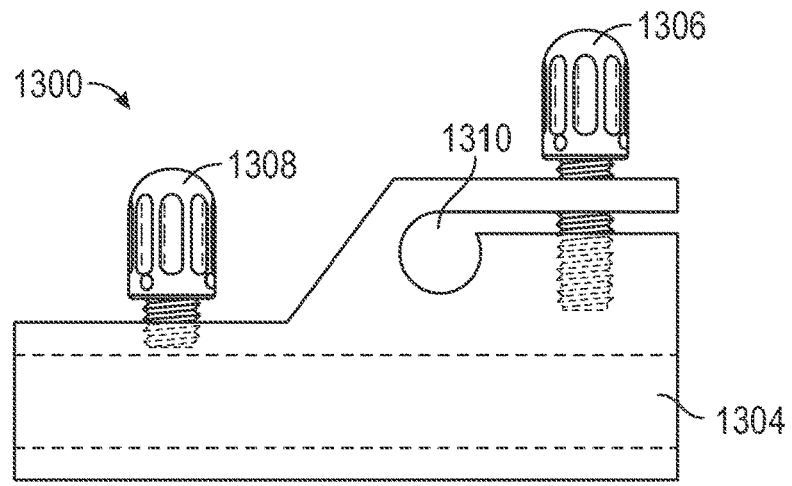
Figure 13C:
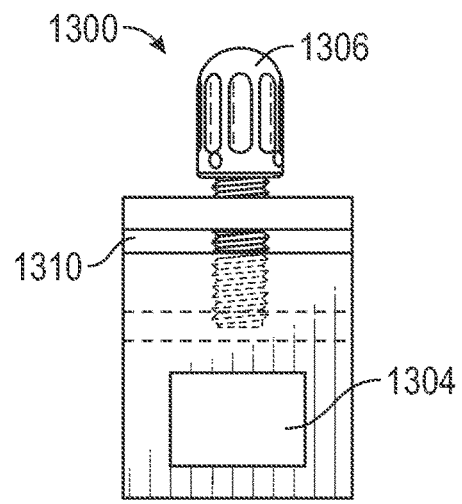

FIGS. 13A-13C depict example clamp 1300, which can be used to couple components to an example clutch apparatus in accordance with this disclosure. Clamp 1300 can be employed, for example, to adjustably couple light source and/or PSD modules to a clutch apparatus. As an example, clamp 1300 could be employed to couple light sources and PSDs to a clutch apparatus instead of tongue clamps 1060, 1062, 1064, 1066 of the example of FIGS. 10-12D.

Example clamp 1300 includes clamp body 1302, aperture 1304, set screws 1306 and 1308, relief 1310, and flange 1312. Aperture 1304 in the example clamp 1300 is a rectangular, or, more generally, rectilinear passage, which is configured to receive a bar or pipe with complimentary cross-sectional shape. For example, aperture 1304 can be sized and shaped to receive a complimentary shape and size extension protruding from a light source and/or PSD module, to attach the light source/PSC module to the clamp. As an example, light sources 1012 and PSDs 1020, instead of including a forked extension, could include a rectangular, square, or other shaped extension that fits in and can be received by aperture 1304 of clamp 1300. Aperture 1304 can also receive a bar or other protrusion that is included in a face bow of a clutch apparatus in accordance with this disclosure to couple clamp 1300 and the light source or PSD connected thereto to the clutch apparatus. The component adjustably coupled to clamp 1300 can be positioned by sliding the component through aperture 1304 to a desired position and tightening one or both of set screws 1306 and 1308.

Relief 1310 forms flange 1312 in body 1302 of clamp 1300. Flange 1312 can provide a spring load on set screw 1306, as the set screw is tightened. For example, clamp 1300 can be fabricated from a metal or polymer, which exhibits some degree of resiliency. As set screw 1306 is tightened, flange 1312 deflects and exhibits a counteracting force from the inherent resiliency of the material to load the tightened set screw.

NOTES & EXAMPLES

The present application provides for the following exemplary embodiments or examples, the numbering of which is not to be construed as designating levels of importance:

Example 1 provides a clutch apparatus comprising: a mandibular clutch device comprising: a mandibular clutch configured to be affixed to mandibular teeth; a mandibular face bow connected to the mandibular clutch; and first and second collimated light sources connected to the mandibular face bow; a maxillary clutch device comprising: a maxillary clutch configured to be affixed to maxilla teeth; a maxillary face bow connected to the maxillary clutch; and first and second position-sensitive diodes (PSDs) connected to the maxillary face bow, wherein each of the mandibular and maxillary face bow is selectively adjustable to position the first and second light sources and the first and second PSDs in a plurality of positions.

Example 2 provides the clutch apparatus of Example 1 and optionally wherein the mandibular and maxillary face bow are selectively adjustable to position the first and second light sources and the first and second PSDs proximate right and left bicuspid regions or proximate the actual physiologic axis of rotation of the mandible.

Example 3 provides the clutch apparatus of Example 1 and/or Example 2 and optionally wherein the mandibular face bow comprises: a medial-lateral crossbar; a first anterior-posterior (AP) bar connected at a first end to a first end of the crossbar; a second AP bar connected at a first end to a second end of the crossbar; and a clutch extension clamp connecting the mandibular clutch to the crossbar, wherein the first collimated light source is connected to a second end of the first AP bar and the second collimated light source is connected to a second end of the second AP bar.

Example 4 provides the clutch apparatus of Example 3 and optionally wherein the first AP bar is connected to the crossbar by a first adjustment clamp, the first adjustment clamp comprising a first mechanism for selectively adjusting the first AP bar anteriorly-posteriorly and a second mechanism for adjusting the first AP bar medially-laterally.

Example 5 provides the clutch apparatus of Example 4 and optionally wherein the first end of the first AP bar is threaded, and wherein the first mechanism of the first adjustment clamp comprises a threaded sleeve configured to receive and threadably engage the first end of the first AP bar and an input control configured to be actuated to thread the first AP bar into and out of the threaded sleeve.

Example 6 provides the clutch apparatus of example 5 and optionally wherein wherein the first end of the crossbar is threaded, and wherein the second mechanism of the first adjustment clamp comprises a threaded sleeve configured to receive and threadably engage the first end of the crossbar and an input control configured to be actuated to thread the crossbar into and out of the threaded sleeve.

Example 7 provides the clutch apparatus of example 3 and optionally wherein the second AP bar is connected to the crossbar by a second adjustment clamp, the second adjustment clamp comprising a first mechanism for selectively adjusting the second AP bar anteriorly-posteriorly and a second mechanism for adjusting the second AP bar medially-laterally.

Example 8 provides the clutch apparatus of example 7 and optionally wherein the first end of the second AP bar is threaded, and wherein the first mechanism of the second adjustment clamp comprises a threaded sleeve configured to receive and threadably engage the first end of the second AP bar and an input control configured to be actuated to thread the second AP bar into and out of the threaded sleeve.

Example 9 provides the clutch apparatus of claim 7 and optionally wherein the second end of the crossbar is threaded, and wherein the second mechanism of the second adjustment clamp comprises a threaded sleeve configured to receive and threadably engage the second end of the crossbar and an input control configured to be actuated to thread the crossbar into and out of the threaded sleeve.

Example 10 provides the clutch apparatus of example 3 and optionally wherein the first and second AP bars are each selectively rotatable relative to and about the crossbar.

Example 11 provides the clutch apparatus of example 3 and optionally wherein the mandibular clutch comprises an extension protruding from the clutch, the extension comprising a forked end.

Example 12 provides the clutch apparatus of example 11 and optionally wherein the clutch extension clamp comprises a tongue clamp configured to receive and secure the forked end of the extension.

Example 13 provides the clutch apparatus of example 3 and optionally wherein the crossbar comprises a spherical portion disposed between the first and second ends of the crossbar.

Example 14 provides the clutch apparatus of example 13 and optionally wherein the clutch extension clamp comprises a semi-spherical clamp configured to adjustably receive and secure the spherical portion of the crossbar.

Example 15 provides the clutch apparatus of any of examples 1-14 and optionally wherein the maxillary face bow comprises: a medial-lateral crossbar; a first anterior-posterior (AP) bar connected at a first end to a first end of the crossbar; a second AP bar connected at a first end to a second end of the crossbar; and a clutch extension clamp connecting the maxillary clutch to the crossbar, wherein the first PSD is connected to a second end of the first AP bar and the second PSD is connected to a second end of the second AP bar.

Example 16 provides the clutch apparatus of example 15 and optionally wherein the first AP bar is connected to the crossbar by a first adjustment clamp, the first adjustment clamp comprising a first mechanism for selectively adjusting the first AP bar anteriorly-posteriorly and a second mechanism for adjusting the first AP bar medially-laterally.

Example 17 provides the clutch apparatus of example 16 and optionally wherein the first end of the first AP bar is threaded, and wherein the first mechanism of the first adjustment clamp comprises a threaded sleeve configured to receive and threadably engage the first end of the first AP bar and an input control configured to be actuated to thread the first AP bar into and out of the threaded sleeve.

Example 18 provides the clutch apparatus of example 16 and optionally wherein the first end of the crossbar is threaded, and wherein the second mechanism of the first adjustment clamp comprises a threaded sleeve configured to receive and threadably engage the first end of the crossbar and an input control configured to be actuated to thread the crossbar into and out of the threaded sleeve.

Example 19 provides the clutch apparatus of example 15 and optionally wherein the second AP bar is connected to the crossbar by a second adjustment clamp, the second adjustment clamp comprising a first mechanism for selectively adjusting the second AP bar anteriorly-posteriorly and a second mechanism for adjusting the second AP bar medially-laterally.

Example 20 provides the clutch apparatus of example 19 and optionally wherein the first end of the second AP bar is threaded, and wherein the first mechanism of the second adjustment clamp comprises a threaded sleeve configured to receive and threadably engage the first end of the second AP bar and an input control configured to be actuated to thread the second AP bar into and out of the threaded sleeve.

Example 21 provides the clutch apparatus of example 19 and optionally wherein the second end of the crossbar is threaded, and wherein the second mechanism of the second adjustment clamp comprises a threaded sleeve configured to receive and threadably engage the second end of the crossbar and an input control configured to be actuated to thread the crossbar into and out of the threaded sleeve.

Example 22 provides the clutch apparatus of example 15 and optionally wherein the first and second AP bars are each selectively rotatable relative to and about the crossbar.

Example 23 provides the clutch apparatus of example 15 and optionally wherein the mandibular clutch comprises an extension protruding from the clutch, the extension comprising a forked end.

Example 24 provides the clutch apparatus of example 11 and optionally wherein the clutch extension clamp comprises a tongue clamp configured to receive and secure the forked end of the extension.

Example 25 provides the clutch apparatus of example 15 and optionally wherein the crossbar comprises a spherical portion disposed between the first and second ends of the crossbar.

Example 26 provides the clutch apparatus of example 25 and optionally wherein the clutch extension clamp comprises a semi-spherical clamp configured to adjustably receive and secure the spherical portion of the crossbar.

Example 28 provides the clutch apparatus of any of examples 1-14 and optionally wherein each of the first and second PSDs comprises a first PSD sensor and a second PSD sensor disposed perpendicular to the first PSD sensor.

Example 29 provides the clutch apparatus of example 1 and optionally further comprising first and second beam splitters, the first and second beam splitters connected to the mandibular face bow and disposed adjacent the first and second light sources.

Example 30 provides the clutch apparatus of example 1 and optionally wherein at least one of the first and second light sources is a laser.

Example 31 provides a mandibular clutch device comprising: a mandibular clutch configured to be affixed to mandibular teeth; a mandibular face bow connected to the mandibular clutch; and first and second collimated light sources connected to the mandibular face bow, wherein the mandibular face bow is selectively adjustable to position the first and second light sources in a plurality of positions.

Example 32 provides the mandibular clutch device of example 31 and optionally wherein the mandibular face bow is selectively adjustable to position the first and second light sources proximate right and left bicuspid regions or proximate the actual physiologic axis of rotation of the mandible.

Example 33 provides a maxillary clutch device comprising: a maxillary clutch configured to be affixed to maxillary teeth; a maxillary face bow connected to the maxillary clutch; and first and second position-sensitive diodes (PSDs) connected to the maxillary face bow, wherein the maxillary face bow is selectively adjustable to position the first and second PSDs in a plurality of positions.

Example 34 provides the maxillary clutch device of example 33 and optionally wherein the maxillary face bow is selectively adjustable to position the first and second PSDs proximate right and left bicuspid regions or proximate the actual physiologic axis of rotation of the mandible.

Example 35 provides a clutch device comprising: a clutch configured to be affixed to a dental arch; a face bow connected to the clutch; and first and second location and/or movement detection components connected to the face bow, wherein the mandibular face bow is selectively adjustable to position the first and second light sources in a plurality of positions.

Example 36 provides the mandibular clutch device of example 35 and optionally wherein the face bow is selectively adjustable to position the first and second detection components proximate right and left bicuspid regions or proximate the actual physiologic axis of rotation of the mandible.

Example 37 provides a method comprising: affixing a first clutch device to a first dental arch; affixing a second clutch device to a second dental arch opposite the first dental arch; selectively adjusting a first location and/or movement detection component of the first clutch device into one or more positions; selectively adjusting a second location and/or movement detection component of the second clutch device into one or more positions corresponding to the one or more positions of the first detection component; and securing the first and second detection components at a target location to detect movement of one of the first and second dental arches relative to the other.

Example 38 provides a clutch apparatus comprising: a mandibular clutch device comprising: a mandibular clutch configured to be affixed to mandibular teeth; a mandibular face bow connected to the mandibular clutch; a first set of first and second collimated light sources configured to be connected to the mandibular face bow; and a second set of first and second collimated light sources configured to be connected to the mandibular face bow; a maxillary clutch device comprising: a maxillary clutch configured to be affixed to maxilla teeth; a maxillary face bow connected to the maxillary clutch; a first set of first and second position-sensitive diodes (PSDs) configured to be connected to the maxillary face bow; and a second set of first and second PSDs configured to be connected to the maxillary face bow, and wherein: the first set of first and second collimated light sources, when connected to the mandibular face bow, are configured to position the first and second light sources proximate right and left bicuspid regions; the second set of first and second collimated light sources, when connected to the mandibular face bow, are configured to position the first and second light sources proximate the actual physiologic axis of rotation of the mandible; the first set of first and second PSDs, when connected to the maxillary face bow, are configured to position the first and second PSDs proximate right and left bicuspid regions; and the second set of first and second PSDs, when connected to the maxillary face bow, are configured to position the first and second PSDs proximate the actual physiologic axis of rotation of the mandible.

Example 39 provides a clutch apparatus comprising: a mandibular clutch device comprising: a mandibular clutch configured to be affixed to mandibular teeth; a mandibular face bow connected to the mandibular clutch; and at least one set of first and second collimated light sources configured to be connected to the mandibular face bow; a maxillary clutch device comprising: a maxillary clutch configured to be affixed to maxilla teeth; a maxillary face bow connected to the maxillary clutch; and at least one set of first and second position-sensitive diodes (PSDs) configured to be connected to the maxillary face bow; wherein the clutch apparatus is configured to selectively position the at least one set of first and second light sources and the at least one set of first and second PSDs in a plurality of positions.

Example 40 provides the clutch apparatus of claim 39 and optionally wherein: the at least one set of first and second collimated light sources comprises one set of first and second light sources; the at least one set of first and second PSDs comprises one set of first and second PSDs; and the mandibular and maxillary face bow are selectively adjustable to position the one set of first and second light sources and the one set of first and second PSDs proximate right and left bicuspid regions or proximate the actual physiologic axis of rotation of the mandible.

Example 41 provides the clutch apparatus of claim 40 and optionally wherein the mandibular face bow comprises: a medial-lateral crossbar; a first anterior-posterior (AP) bar connected at a first end to a first end of the crossbar; a second AP bar connected at a first end to a second end of the crossbar; and a clutch extension clamp connecting the mandibular clutch to the crossbar, wherein the first collimated light source is connected to a second end of the first AP bar and the second collimated light source is connected to a second end of the second AP bar.

Example 42 provides the clutch apparatus of claim 41 and optionally wherein the first AP bar is connected to the crossbar by a first adjustment clamp, the first adjustment clamp comprising a first mechanism for selectively adjusting the first AP bar anteriorly-posteriorly and a second mechanism for adjusting the first AP bar medially-laterally.

Example 43 provides the clutch apparatus of claim 42 and optionally wherein the first end of the first AP bar is threaded, and wherein the first mechanism of the first adjustment clamp comprises a threaded sleeve configured to receive and threadably engage the first end of the first AP bar and an input control configured to be actuated to thread the first AP bar into and out of the threaded sleeve.

Example 44 provides the clutch apparatus of claim 42 and optionally wherein the first end of the crossbar is threaded, and wherein the second mechanism of the first adjustment clamp comprises a threaded sleeve configured to receive and threadably engage the first end of the crossbar and an input control configured to be actuated to thread the crossbar into and out of the threaded sleeve.

Example 45 provides the clutch apparatus of claim 41 and optionally wherein the second AP bar is connected to the crossbar by a second adjustment clamp, the second adjustment clamp comprising a first mechanism for selectively adjusting the second AP bar anteriorly-posteriorly and a second mechanism for adjusting the second AP bar medially-laterally.

Example 46 provides the clutch apparatus of claim 45 and optionally wherein the first end of the second AP bar is threaded, and wherein the first mechanism of the second adjustment clamp comprises a threaded sleeve configured to receive and threadably engage the first end of the second AP bar and an input control configured to be actuated to thread the second AP bar into and out of the threaded sleeve.

Example 47. The clutch apparatus of claim 46, wherein the second end of the crossbar is threaded, and wherein the second mechanism of the second adjustment clamp comprises a threaded sleeve configured to receive and threadably engage the second end of the crossbar and an input control configured to be actuated to thread the crossbar into and out of the threaded sleeve.

Example 48 provides the clutch apparatus of claim 41 and optionally wherein the first and second AP bars are each selectively rotatable relative to and about the crossbar.

Example 49 provides the clutch apparatus of claim 41 and optionally wherein the mandibular clutch comprises an extension protruding from the clutch, the extension comprising a forked end.

Example 50 provides the clutch apparatus of claim 49 and optionally wherein the clutch extension clamp comprises a tongue clamp configured to receive and secure the forked end of the extension.

Example 51 provides the clutch apparatus of claim 41 and optionally wherein the crossbar comprises a spherical portion disposed between the first and second ends of the crossbar.

Example 52 provides the clutch apparatus of claim 51 and optionally wherein the clutch extension clamp comprises a semi-spherical clamp configured to adjustably receive and secure the spherical portion of the crossbar.

Example 53 provides the clutch apparatus of claim 40 and optionally wherein the maxillary face bow comprises: a medial-lateral crossbar; a first anterior-posterior (AP) bar connected at a first end to a first end of the crossbar; a second AP bar connected at a first end to a second end of the crossbar; and a clutch extension clamp connecting the maxillary clutch to the crossbar, wherein the first PSD is connected to a second end of the first AP bar and the second PSD is connected to a second end of the second AP bar.

Example 54 provides the clutch apparatus of claim 53 and optionally wherein the first AP bar is connected to the crossbar by a first adjustment clamp, the first adjustment clamp comprising a first mechanism for selectively adjusting the first AP bar anteriorly-posteriorly and a second mechanism for adjusting the first AP bar medially-laterally.

Example 55 provides the clutch apparatus of claim 54 and optionally wherein the first end of the first AP bar is threaded, and wherein the first mechanism of the first adjustment clamp comprises a threaded sleeve configured to receive and threadably engage the first end of the first AP bar and an input control configured to be actuated to thread the first AP bar into and out of the threaded sleeve.

Example 56 provides the clutch apparatus of claim 54 and optionally wherein the first end of the crossbar is threaded, and wherein the second mechanism of the first adjustment clamp comprises a threaded sleeve configured to receive and threadably engage the first end of the crossbar and an input control configured to be actuated to thread the crossbar into and out of the threaded sleeve.

Example 57 provides the clutch apparatus of claim 53 and optionally wherein the second AP bar is connected to the crossbar by a second adjustment clamp, the second adjustment clamp comprising a first mechanism for selectively adjusting the second AP bar anteriorly-posteriorly and a second mechanism for adjusting the second AP bar medially-laterally.

Example 58 provides the clutch apparatus of claim 57 and optionally wherein the first end of the second AP bar is threaded, and wherein the first mechanism of the second adjustment clamp comprises a threaded sleeve configured to receive and threadably engage the first end of the second AP bar and an input control configured to be actuated to thread the second AP bar into and out of the threaded sleeve.

Example 59 provides the clutch apparatus of claim 57 and optionally wherein the second end of the crossbar is threaded, and wherein the second mechanism of the second adjustment clamp comprises a threaded sleeve configured to receive and threadably engage the second end of the crossbar and an input control configured to be actuated to thread the crossbar into and out of the threaded sleeve.

Example 60 provides the clutch apparatus of claim 53 and optionally wherein the first and second AP bars are each selectively rotatable relative to and about the crossbar.

Example 61 provides the clutch apparatus of claim 53 and optionally wherein the mandibular clutch comprises an extension protruding from the clutch, the extension comprising a forked end.

Example 62 provides the clutch apparatus of claim 61 and optionally wherein the clutch extension clamp comprises a tongue clamp configured to receive and secure the forked end of the extension.

Example 63 provides the clutch apparatus of claim 53 and optionally wherein the crossbar comprises a spherical portion disposed between the first and second ends of the crossbar.

Example 64 provides the clutch apparatus of claim 63 and optionally wherein the clutch extension clamp comprises a semi-spherical clamp configured to adjustably receive and secure the spherical portion of the crossbar.

Example 65 provides the clutch apparatus of claim 39 and optionally wherein each of the first and second PSDs of the at least one set of first and second PSDs comprises a first PSD sensor and a second PSD sensor disposed perpendicular to the first PSD sensor.

Example 66 provides the clutch apparatus of claim 39, wherein: the at least one set of first and second collimated light sources comprises: a first set of first and second collimated light sources configured to be connected to the mandibular face bow; and a second set of first and second collimated light sources configured to be connected to the mandibular face bow; the at least one set of first and second PSDs comprises: a first set of first and second position-sensitive diodes (PSDs) configured to be connected to the maxillary face bow; and a second set of first and second PSDs configured to be connected to the maxillary face bow; the first set of first and second collimated light sources, when connected to the mandibular face bow, are configured to position the first and second light sources proximate right and left bicuspid regions; the second set of first and second collimated light sources, when connected to the mandibular face bow, are configured to position the first and second light sources proximate the actual physiologic axis of rotation of the mandible; the first set of first and second PSDs, when connected to the mandibular face bow, are configured to position the first and second PSDs proximate right and left bicuspid regions; and the second set of first and second collimated light sources, when connected to the mandibular face bow, are configured to position the first and second light sources proximate the actual physiologic axis of rotation of the mandible.

Example 67 provides the clutch apparatus of claim 66 and optionally further comprising: a first tongue clamp configured to connect the first light source of either the first set of first and second light sources or the second set of first and second light sources to the mandibular face bow; a second tongue clamp configured to connected the second light source of either the first set of first and second light sources or the second set of first and second light sources to the mandibular face bow; a third tongue clamp configured to connect the first PSD of either the first set of first and second PSDs or the second set of first and second PSDs to the maxillary face bow; and a fourth tongue clamp configured to connect the second PSD of either the first set of first and second PSDs or the second set of first and second PSDs to the maxillary face bow.

Example 68 provides the clutch apparatus of claim 67 and optionally wherein: the first light source of each of the first set of first and second light sources and the second set of first and second light sources comprises a first extension protruding from the first light source, the first extension comprising a first forked end, the first forked end configured to be received by the first tongue clamp; and the second light source of each of the first set of first and second light sources and the second set of first and second light sources comprises a second extension protruding from the second light source, the second extension comprising a second forked end, the second forked end configured to be received by the second tongue clamp, a length of the first extension is different than a length of the second extension.

Example 69 provides the clutch apparatus of claim 68, wherein: the first PSD of each of the first set of first and second PSDs and the second set of first and second PSDs comprises a third extension protruding from the first PSD, the third extension comprising a third forked end, the third forked end configured to be received by the third tongue clamp; and the second PSD of each of the first set of first and second PSDs and the second set of first and second PSDs comprises a fourth extension protruding from the second fourth, the fourth extension comprising a fourth forked end, the fourth forked end configured to be received by the fourth tongue clamp, a length of the third extension is different than a length of the fourth extension.

Example 70 provides a clutch alignment device configured to align a midline of the clutch with an anatomical midline. The clutch alignment device can include includes a clamp configured to connect to the clutch, an anterior bar, and first and second lateral bars. The anterior bar extends anteriorly from the clamp. The first lateral bar extends laterally in a first direction and the second lateral bar extends laterally in a second direction opposite the first direction. The first and second lateral bars are perpendicular to the anterior bar.

Example 71 provides a mandibular clutch device comprising: a mandibular clutch configured to be affixed to maxillary teeth; a mandibular face bow connected to the maxillary clutch; and a first set of first and second collimated light sources configured to be connected to the mandibular face bow; and a second set of first and second collimated light sources configured to be connected to the mandibular face bow, wherein: the first set of first and second collimated light sources, when connected to the mandibular face bow, are configured to position the first and second light sources proximate right and left bicuspid regions; and the second set of first and second collimated light sources, when connected to the mandibular face bow, are configured to position the first and second light sources proximate the actual physiologic axis of rotation of the mandible.

Example 72 provides a maxillary clutch device comprising: a maxillary clutch configured to be affixed to maxillary teeth; a maxillary face bow connected to the maxillary clutch; and a first set of first and second position-sensitive diodes (PSDs) configured to be connected to the maxillary face bow; and a second set of first and second PSDs configured to be connected to the maxillary face bow, and wherein: the first set of first and second PSDs, when connected to the maxillary face bow, are configured to position the first and second PSDs proximate right and left bicuspid regions; and the second set of first and second PSDs, when connected to the maxillary face bow, are configured to position the first and second light sources proximate the actual physiologic axis of rotation of the mandible.

Example 73 provides a clutch device for a dental arch comprising: a clutch configured to be affixed to a dental arch; a face bow connected to the clutch; and a first set of location and/or movement detection components connected to the face bow; a second set of location and/or movement detection components connected to the face bow, wherein: the first set of location and/or movement detection components, when connected to the face bow, are configured to position the location and/or movement detection components proximate right and left bicuspid regions; and the second set of location and/or movement detection components, when connected to the face bow, are configured to position the location and/or movement detection components proximate the actual physiologic axis of rotation of the mandible.

Example 74 provides the clutch alignment device of example 70 and optionally wherein the mandibular clutch comprises an extension protruding from the clutch, the extension comprising a forked end, and wherein the clamp comprises a tongue clamp configured to receive and secure the forked end of the extension.

Various examples according to this disclosure have been described. These and other examples are within the scope of the following claims.

The invention claimed is:
1. A clutch apparatus comprising:
 a mandibular clutch device comprising:
  a mandibular clutch configured to be affixed to mandibular teeth;
  a mandibular face bow connected to the mandibular clutch; and
  a first set of first and second collimated light sources configured to be connected to the mandibular face bow; and
  a second set of first and second collimated light sources configured to be connected to the mandibular face bow;
 a maxillary clutch device comprising:
  a maxillary clutch configured to be affixed to maxilla teeth;
  a maxillary face bow connected to the maxillary clutch;
  a first set of first and second position-sensitive diodes (PSDs) configured to be connected to the maxillary face bow; and
  a second set of first and second PSDs configured to be connected to the maxillary face bow,
 wherein:
  the first set of first and second collimated light sources are configured to be connected to the mandibular face bow and the first set of first and second PSDs are configured to be connected to the maxillary face bow to position the first set of first and second collimated light sources and the first set of first and second PSDs proximate right and left bicuspid regions; and
  replacing the first set of first and second collimated light sources with the second set of first and second collimated light sources and replacing the first set of first and second PSDs with the second set of first and second PSDs positions the second set of first and second collimated light sources and the second set of first and second PSDs proximate the actual physiologic axis of rotation of the mandible.
2. The clutch apparatus of claim 1, wherein the mandibular face bow comprises:
 a medial-lateral crossbar;
 a first anterior-posterior (AP) bar connected at a first end to a first end of the crossbar;
 a second AP bar connected at a first end to a second end of the crossbar; and a clutch extension clamp connecting the mandibular clutch to the crossbar, wherein the first collimated light source of the first set of first and second collimated light sources and the first collimated light source of the second set of first and second collimated light sources are configured to be connected to a second end of the first AP bar, and wherein the second collimated light source of the first set of first and second collimated light sources and the second collimated light source of the second set of first and second collimated light sources are configured to be connected to a second end of the second AP bar.

3. The clutch apparatus of claim 2, wherein the second AP bar is connected to the crossbar by a second adjustment clamp, the second adjustment clamp comprising a first mechanism for selectively adjusting the second AP bar anteriorly-posteriorly and a second mechanism for adjusting the second AP bar medially-laterally.

4. The clutch apparatus of claim 3, wherein the first end of the second AP bar is threaded, and wherein the first mechanism of the second adjustment clamp comprises a threaded sleeve configured to receive and threadably engage the first end of the second AP bar and an input control configured to be actuated to thread the second AP bar into and out of the threaded sleeve.

5. The clutch apparatus of claim 4, wherein the second end of the crossbar is threaded, and wherein the second mechanism of the second adjustment clamp comprises a threaded sleeve configured to receive and threadably engage the second end of the crossbar and an input control configured to be actuated to thread the crossbar into and out of the threaded sleeve.

6. The clutch apparatus of claim 2, wherein the first and second AP bars are each selectively rotatable relative to and about the crossbar.

7. The clutch apparatus of claim 2, wherein the mandibular clutch comprises an extension protruding from the clutch, the extension comprising a forked end.

8. The clutch apparatus of claim 7, wherein the clutch extension clamp comprises a tongue clamp configured to receive and secure the forked end of the extension.

9. The clutch apparatus of claim 2, wherein the crossbar comprises a spherical portion disposed between the first and second ends of the crossbar, and wherein the clutch extension clamp comprises a semi-spherical clamp configured to adjustably receive and secure the spherical portion of the crossbar.

10. The clutch apparatus of claim 2, wherein the first AP bar is connected to the crossbar by a first adjustment clamp, the first adjustment clamp comprising a first mechanism for selectively adjusting the first AP bar anteriorly-posteriorly and a second mechanism for adjusting the first AP bar medially-laterally.

11. The clutch apparatus of claim 10, wherein the first end of the first AP bar is threaded, and wherein the first mechanism of the first adjustment clamp comprises a threaded sleeve configured to receive and threadably engage the first end of the first AP bar and an input control configured to be actuated to thread the first AP bar into and out of the threaded sleeve.

12. The clutch apparatus of claim 10, wherein the first end of the crossbar is threaded, and wherein the second mechanism of the first adjustment clamp comprises a threaded sleeve configured to receive and threadably engage the first end of the crossbar and an input control configured to be actuated to thread the crossbar into and out of the threaded sleeve.

13. The clutch apparatus of claim 1, wherein the maxillary face bow comprises:

a medial-lateral crossbar;

a first anterior-posterior (AP) bar connected at a first end to a first end of the crossbar;

a second AP bar connected at a first end to a second end of the crossbar; and a clutch extension clamp connecting the maxillary clutch to the crossbar, wherein the first PSD of the first set of first and second PSDs and the first PSD of the second set of first and second PSDs are configured to be connected to a second end of the first AP bar, and wherein the second PSD of the first set of first and second PSDs and the second PSD of the second set of first and second PSDs are configured to be connected to a second end of the second AP bar.

14. The clutch apparatus of claim 13, wherein the first AP bar is connected to the crossbar by a first adjustment clamp, the first adjustment clamp comprising a first mechanism for selectively adjusting the first AP bar anteriorly-posteriorly and a second mechanism for adjusting the first AP bar medially-laterally.

15. The clutch apparatus of claim 14, wherein the first end of the first AP bar is threaded, and wherein the first mechanism of the first adjustment clamp comprises a threaded sleeve configured to receive and threadably engage the first end of the first AP bar and an input control configured to be actuated to thread the first AP bar into and out of the threaded sleeve.

16. The clutch apparatus of claim 14, wherein the first end of the crossbar is threaded, and wherein the second mechanism of the first adjustment clamp comprises a threaded sleeve configured to receive and threadably engage the first end of the crossbar and an input control configured to be actuated to thread the crossbar into and out of the threaded sleeve.

17. The clutch apparatus of claim 13, wherein the second AP bar is connected to the crossbar by a second adjustment clamp, the second adjustment clamp comprising a first mechanism for selectively adjusting the second AP bar anteriorly-posteriorly and a second mechanism for adjusting the second AP bar medially-laterally.

18. The clutch apparatus of claim 17, wherein the first end of the second AP bar is threaded, and wherein the first mechanism of the second adjustment clamp comprises a threaded sleeve configured to receive and threadably engage the first end of the second AP bar and an input control configured to be actuated to thread the second AP bar into and out of the threaded sleeve.

19. The clutch apparatus of claim 18, wherein the second end of the crossbar is threaded, and wherein the second mechanism of the second adjustment clamp comprises a threaded sleeve configured to receive and threadably engage the second end of the crossbar and an input control configured to be actuated to thread the crossbar into and out of the threaded sleeve.

20. The clutch apparatus of claim 13, wherein the first and second AP bars are each selectively rotatable relative to and about the crossbar.

21. The clutch apparatus of claim 13, wherein the mandibular clutch comprises an extension protruding from the clutch, the extension comprising a forked end.

22. The clutch apparatus of claim 21, wherein the clutch extension clamp comprises a tongue clamp configured to receive and secure the forked end of the extension.

23. The clutch apparatus of claim 13, wherein the crossbar comprises a spherical portion disposed between the first and second ends of the crossbar, and wherein the clutch extension clamp comprises a semi-spherical clamp configured to adjustably receive and secure the spherical portion of the crossbar.

24. The clutch apparatus of claim 1, further comprising:
- a first tongue clamp configured to connect the first light source of either the first set of first and second light sources or the second set of first and second light sources to the mandibular face bow;
- a second tongue clamp configured to connected the second light source of either the first set of first and second light sources or the second set of first and second light sources to the mandibular face bow;
- a third tongue clamp configured to connect the first PSD of either the first set of first and second PSDs or the second set of first and second PSDs to the maxillary face bow; and
- a fourth tongue clamp configured to connect the second PSD of either the first set of first and second PSDs or the second set of first and second PSDs to the maxillary face bow.

* * * * *